(12) United States Patent
McDaniel et al.

(10) Patent No.: US 12,005,425 B2
(45) Date of Patent: *Jun. 11, 2024

(54) METHODS OF PREPARING A CATALYST WITH LOW HRVOC EMISSIONS

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Eric D. Schwerdtfeger, Bartlesville, OK (US); Jeremy M. Praetorius, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,050

(22) Filed: Jun. 13, 2022

(65) Prior Publication Data

US 2022/0305463 A1    Sep. 29, 2022

Related U.S. Application Data

(60) Continuation of application No. 17/580,258, filed on Jan. 20, 2022, now Pat. No. 11,383,222, which is a (Continued)

(51) Int. Cl.
*B01J 21/08* (2006.01)
*B01J 23/26* (2006.01)
(Continued)

(52) U.S. Cl.
CPC ............ *B01J 21/08* (2013.01); *B01J 23/26* (2013.01); *B01J 37/0217* (2013.01);
(Continued)

(58) Field of Classification Search
CPC ... B01J 23/00; B01J 23/24; B01J 23/26; B01J 21/00; B01J 21/06; B01J 21/08;
(Continued)

(56) References Cited

U.S. PATENT DOCUMENTS 2,503,913 A    4/1950   Kimberlin, Jr.
3,119,569 A    1/1964   Baricordi
(Continued)

FOREIGN PATENT DOCUMENTS

EA    015825 B1    12/2011
EP    0033953 A2    8/1981
(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
(Continued)

*Primary Examiner* — Smita S Patel
(74) *Attorney, Agent, or Firm* — Conley Rose, P.C.

(57) ABSTRACT

A method of preparing a catalyst comprising a) drying a chrominated-silica support followed by contacting with a titanium(IV) alkoxide to form a metalized support, b) drying a metalized support followed by contacting with an aqueous alkaline solution comprising from about 3 wt. % to about 20 wt. % of a nitrogen-containing compound to form a hydrolyzed metalized support, and c) drying the hydrolyzed metalized support followed by calcination at a temperature in a range of from about 400° C. to about 1000° C. and maintaining the temperature in the range of from about 400° C. to about 1000° C. for a time period of from about 1 minute to about 24 hours to form the catalyst.

14 Claims, 1 Drawing Sheet

Related U.S. Application Data division of application No. 15/953,927, filed on Apr. 16, 2018, now Pat. No. 11,266,976.

(51) Int. Cl.
  *B01J 37/02* (2006.01)
  *B01J 37/08* (2006.01)

(52) U.S. Cl.
  CPC ......... *B01J 37/0236* (2013.01); *B01J 37/024* (2013.01); *B01J 37/08* (2013.01)

(58) Field of Classification Search
  CPC .... B01J 37/06; B01J 37/0217; B01J 37/0236; B01J 37/024; B01J 37/08; B01J 37/036; B01J 37/0207; C08F 110/00; C08F 110/02; C01B 33/00
  See application file for complete search history.

(56) References Cited

U.S. PATENT DOCUMENTS

| | | |
|---|---|---|
| 3,248,179 A | 4/1966 | Norwood |
| 3,622,521 A | 11/1971 | Hogan |
| 3,704,287 A | 11/1972 | Johnson |
| 3,780,011 A | 12/1973 | Pullukat |
| 3,875,079 A | 4/1975 | Witt |
| 3,882,096 A | 5/1975 | Shida |
| 3,887,494 A | 6/1975 | Dietz |
| 3,900,457 A | 8/1975 | Witt |
| 3,970,613 A | 7/1976 | Goldie |
| 3,976,632 A | 8/1976 | Delap |
| 4,041,224 A | 8/1977 | Hoff |
| 4,053,436 A | 10/1977 | Hogan |
| 4,119,569 A | 10/1978 | Dietz |
| 4,169,923 A | 10/1979 | Ferruti |
| 4,190,457 A | 2/1980 | McDaniel |
| 4,218,345 A | 8/1980 | Hoff |
| 4,247,421 A | 1/1981 | McDaniel |
| 4,280,141 A | 7/1981 | McCann |
| 4,294,724 A | 10/1981 | McDaniel |
| 4,296,001 A | 10/1981 | Hawley |
| 4,299,731 A | 11/1981 | McDaniel |
| 4,305,841 A | 12/1981 | Gutweiler |
| 4,312,967 A | 1/1982 | Norwood |
| 4,345,055 A | 8/1982 | Hawley |
| 4,368,303 A | 1/1983 | McDaniel |
| 4,402,864 A | 9/1983 | McDaniel |
| 4,405,501 A | 9/1983 | Witt |
| 4,405,768 A | 9/1983 | McDaniel |
| 4,424,320 A | 1/1984 | McDaniel |
| 4,434,243 A | 2/1984 | Martin |
| 4,442,275 A | 4/1984 | Martin |
| 4,446,243 A | 5/1984 | Chester |
| 4,501,885 A | 2/1985 | Sherk |
| 4,547,557 A | 10/1985 | McDaniel |
| 4,559,394 A | 12/1985 | McDaniel |
| 4,588,790 A | 5/1986 | Jenkins, III |
| 4,832,022 A | 5/1989 | Tjulkov |
| 4,981,831 A | 1/1991 | Knudsen |
| 5,115,053 A | 5/1992 | Knudsen |
| 5,183,792 A | 2/1993 | Wang |
| 5,231,066 A | 7/1993 | Rekers |
| 5,284,926 A | 2/1994 | Benham |
| 5,352,749 A | 10/1994 | DeChellis |
| 5,426,082 A | 6/1995 | Marsden |
| 5,436,304 A | 7/1995 | Griffin |
| 5,455,314 A | 10/1995 | Burns |
| 5,478,898 A | 12/1995 | Standaert |
| 5,565,175 A | 10/1996 | Hottovy |
| 5,575,979 A | 11/1996 | Hanson |
| 5,576,262 A | 11/1996 | Denton |
| 5,599,762 A | 2/1997 | Denton |
| 5,914,291 A | 6/1999 | Marsden |
| 5,965,675 A | 10/1999 | Kellum |
| 6,200,920 B1 | 3/2001 | Debras |
| 6,239,235 B1 | 5/2001 | Hottovy |
| 6,262,191 B1 | 7/2001 | Hottovy |
| 6,423,663 B2 | 7/2002 | Debras |
| 6,482,901 B1 | 11/2002 | Debras |
| 6,489,428 B1 | 12/2002 | Debras |
| 6,624,324 B2 | 9/2003 | Iwakura |
| 6,657,023 B2 | 12/2003 | Bergmeister |
| 6,707,498 B1 | 3/2004 | Toma |
| 6,833,415 B2 | 12/2004 | Kendrick |
| 6,855,781 B2 | 2/2005 | Bergmeister |
| 7,088,394 B2 | 8/2006 | Rossi |
| 7,262,259 B2 | 8/2007 | Katzen |
| 7,375,169 B1 | 5/2008 | Smith |
| 7,390,395 B2 | 6/2008 | Elomari |
| 7,700,516 B2 | 4/2010 | McDaniel |
| 7,803,736 B2 | 9/2010 | Rohde |
| 7,981,832 B2 | 7/2011 | McDaniel |
| 8,183,173 B2 | 5/2012 | McDaniel |
| 8,367,785 B2 | 2/2013 | Chamayou |
| 8,372,771 B2 | 2/2013 | Benham |
| 9,023,967 B2 | 5/2015 | Yu |
| 9,096,699 B2 | 8/2015 | McDaniel |
| 9,243,091 B2 | 1/2016 | Moineau |
| 9,587,048 B2 | 3/2017 | Praetorius |
| 9,598,513 B2 | 3/2017 | Yu |
| 9,796,798 B2 | 10/2017 | Praetorius |
| 9,879,101 B2 | 1/2018 | Yu |
| 9,988,468 B2 | 6/2018 | McDaniel |
| 10,213,766 B2 | 2/2019 | Praetorius |
| 10,287,369 B2 | 5/2019 | Schwerdtfeger |
| 10,323,108 B2 | 6/2019 | Yu |
| 10,323,109 B2 | 6/2019 | McDaniel |
| 10,513,570 B2 | 12/2019 | McDaniel |
| 10,543,480 B2 | 1/2020 | McDaniel |
| 10,654,953 B2 | 5/2020 | McDaniel |
| 10,669,362 B2 | 6/2020 | McDaniel |
| 10,722,874 B2 | 7/2020 | McDaniel |
| 10,858,456 B1 | 12/2020 | McDaniel |
| 10,858,460 B2 | 12/2020 | McDaniel |
| 10,894,249 B2 | 1/2021 | McDaniel |
| 10,894,250 B2 | 1/2021 | McDaniel |
| 10,988,557 B2 | 4/2021 | McDaniel |
| 11,110,443 B2 | 9/2021 | McDaniel |
| 11,117,122 B2 | 9/2021 | McDaniel |
| 11,220,564 B2 | 1/2022 | McDaniel |
| 11,242,416 B2 | 2/2022 | McDaniel |
| 11,242,417 B2 | 2/2022 | McDaniel |
| 11,267,908 B2 | 3/2022 | McDaniel |
| 11,383,222 B2 * | 7/2022 | McDaniel ................ B01J 23/26 |
| 11,384,171 B2 | 7/2022 | McDaniel |
| 2003/0007083 A1 | 1/2003 | Rossi |
| 2004/0026324 A1 | 2/2004 | Luca |
| 2005/0153830 A1 | 7/2005 | Jensen |
| 2005/0192177 A1 | 9/2005 | Roger |
| 2005/0272886 A1 | 12/2005 | Cann |
| 2007/0034549 A1 | 2/2007 | Elomari |
| 2008/0038161 A1 | 2/2008 | Marti |
| 2010/0069585 A1 | 3/2010 | Bodart |
| 2011/0201768 A1 | 8/2011 | Benham |
| 2013/0137839 A1 | 5/2013 | Yu |
| 2014/0275457 A1 | 9/2014 | McDaniel |
| 2014/0295178 A1 | 10/2014 | Watanabe |
| 2015/0065667 A1 | 3/2015 | Cheng |
| 2017/0037158 A1 | 2/2017 | Yu |
| 2017/0080406 A1 | 3/2017 | Praetorius |
| 2018/0094087 A1 | 4/2018 | McDaniel |
| 2019/0134610 A1 | 5/2019 | Praetorius |
| 2019/0151826 A1 * | 5/2019 | McDaniel ................ B01J 21/08 |
| 2020/0164351 A1 | 5/2020 | McDaniel |
| 2021/0370281 A1 | 12/2021 | McDaniel |
| 2021/0387172 A1 | 12/2021 | McDaniel |

FOREIGN PATENT DOCUMENTS

| | | |
|---|---|---|
| EP | 0088989 A2 | 9/1983 |
| EP | 0314385 A2 | 5/1989 |
| EP | 0085857 B1 | 8/1989 |
| EP | 0337365 A2 | 10/1989 |
| EP | 0439294 A1 | 7/1991 |

(56) References Cited

FOREIGN PATENT DOCUMENTS

| | | |
|---|---|---|
| EP | 0339571 B1 | 2/1994 |
| EP | 0589643 A1 | 3/1994 |
| EP | 0455444 B1 | 10/1997 |
| EP | 0882744 B1 | 7/2003 |
| EP | 0882743 B1 | 11/2003 |
| EP | 1845110 A1 | 10/2007 |
| EP | 2606962 A1 | 6/2013 |
| GB | 1197069 A | 7/1970 |
| GB | 1369485 A | 10/1974 |
| GB | 1405721 A | 9/1975 |
| GB | 1415649 A | 11/1975 |
| GB | 1447605 A | 8/1976 |
| GB | 1575419 A | 9/1980 |
| JP | 2011117006 A | 6/2011 |
| KR | 20070015410 A | 2/2007 |
| KR | 101941732 B1 | 4/2019 |
| SU | 940634 A3 | 6/1982 |
| SU | 1033504 A1 | 8/1983 |
| WO | 2002002652 A2 | 1/2002 |
| WO | 2003003350 W | 1/2003 |
| WO | 2004052948 A1 | 6/2004 |
| WO | 2005103100 A1 | 11/2005 |
| WO | 2009042149 A2 | 4/2009 |
| WO | 2009045215 A1 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2016176189 A1 | 11/2016 |
| WO | 2017048930 A1 | 3/2017 |
| WO | 2018200273 A1 | 11/2018 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

Conway, Steven J., et al., "Chromia/silica-titania cogel catalysts for ethene polymerisation," J. Chem. Soc., Faraday Trans., 1989, pp. 1841-1851, vol. 85, No. 7.

Conway, Steven J., et al., "Chromia/silica-titania cogel catalysts for ethene polymerisation," J. Chem. Soc., Faraday Trans., 1989, pp. 71-78, vol. 85, No. 1.

Conway, Steven J., et al., "Chromia/silica-titania cogel catalysts for ethene polymerisation," J. Chem. Soc., Faraday Trans., 1989, pp. 79-90, vol. 85, No. 1.

Ellison, Alan, et al., "Characterisation of cr/silica catalysts," J. Chem. Soc. Faraday Trans., 1993, pp. 4393-4395, vol. 89, No. 24.

Ellison, Alan, et al., "Characterisation of modified cr-silica catalysts," Journal of Molecular Catalysis, 1994, pp. 81-86, vol. 90, Elsevier Science B.V.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

Iler, Ralph K., "The Chemistry of Silica: Solubility, Polymerization, Colloid and Surface Properties and Biochemistry of Silica," 1979, 1 page, Wiley.

IUPAC Compendium of Chemical Terminology, 2nd Ed. 1997, pp. 1-1670.

Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.

McDaniel, M. P., et al., Activation of Phillips Cr/silica catalysts IV. Mobility of Cr(VI), Journal of Catalysis, 1982, pp. 37-47, vol. 76, Academic Press, Inc.

McDaniel, M. P., et al., Activation of Phillips Cr/silica catalysts IV. Mobility of Cr(VI), Journal of Catalysis, 2007, pp. 281-295, vol. 252, Academic Press, Inc.

McDaniel, M. P., et al., "The activation of the phillips polymerization catalyst," Journal of Catalysis, 1983, pp. 118-126, vol. 82, Academic Press, Inc.

McDaniel, M. P., et al., The State of Cr(VI) on the Phillips Polymerization Catalyst, Journal of Catalysis, 1982, pp. 29-36, vol. 76, Academic Press, Inc.

Niemanstverdriet, J.W., "Spectroscopy in Catalysis: An Introduction," Jul. 11, 2008, 3rd Edition, pp. 251-295, Section 9.5, WILEY-VCH.

Product Information, "LUDOX® SM-AS Colloidal Silica," 2005, W. R. Grace & Co.-Conn., 2 pages.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.

Yu, Youlu, et al., "SEC-MALS method for the determination of long-chain branching and long-chain branching distribution in polyethylene," Polymer, 2005, pp. 5165-5182, vol. 46, Elsevier Ltd.

Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.

Search Report issued in corresponding Russian Application No. 2021131357, 2 pp.

* cited by examiner

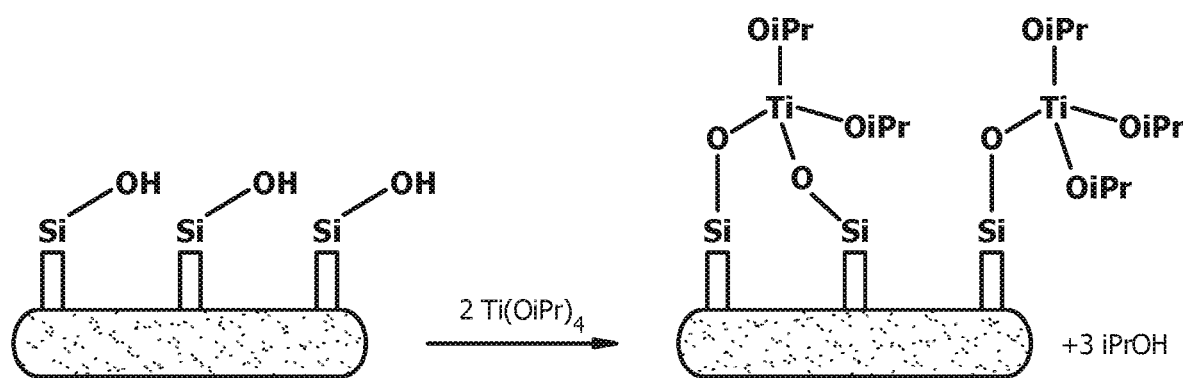

METHODS OF PREPARING A CATALYST WITH LOW HRVOC EMISSIONS

CROSS-REFERENCE TO RELATED APPLICATIONS

This application is a continuation of and claims priority to U.S. patent application Ser. No. 17/580,258 filed Jan. 20, 2022, published as U.S. Patent Application Publication No. 2022/0134311 A1, which is a divisional of and claims priority to U.S. patent application Ser. No. 15/953,927 filed Apr. 16, 2018, now U.S. Pat. No. 11,266,976 B2, each entitled "Methods of Preparing a Catalyst with Low HRVOC Emissions," each of which is incorporated by reference herein in its entirety.

TECHNICAL FIELD

The present disclosure relates to catalyst compositions. More specifically, the present disclosure relates to methods of preparing olefin polymerization catalyst compositions and polymers prepared from same.

BACKGROUND

An economically important class of olefin polymerization catalysts includes chromium-silica-titanium catalysts. Enhancements in preparation methods for olefin polymerization catalysts can reduce the costs associated with catalyst production and improve process economics. For example, highly reactive volatile organic compounds (HRVOC) may be emitted during catalyst production. HRVOCs play a role in the formation of ozone in ozone nonattainment areas, i.e., areas that do not meet the Environmental Protection Agency's air quality standards for ground-level ozone. Consequently, processes that create HRVOC emissions may be subject to compliance with various state and federal regulations regarding HRVOC emission, such as the HRVOC emissions cap and trade program. Thus, there is an ongoing need to develop processes for the production of olefin polymerization catalysts that create minimal HRVOC emissions.

SUMMARY

Disclosed herein is a method of preparing a hydrolyzed pre-catalyst comprising a) drying a silica support by heating to a temperature in a range of from about 150° C. to about 250° C. and maintaining the temperature in the range of from about 150° C. to about 250° C. for a time period of from about 1 hour to about 24 hours to form a dried support; b) contacting the dried support and a titanium(IV) alkoxide to form a titanated support; c) drying the titanated support by heating to a temperature in a range of from about 50° C. to about 200° C. and maintaining the temperature in the range of from about 50° C. to about 200° C. for a time period of from about 30 minutes to about 6 hours to form a dried titanated support; d) contacting the dried titanated support and an aqueous alkaline solution comprising from about 3 wt. % to about 20 wt. % of a nitrogen-containing compound for a time period of from about 10 minutes to about 6 hours to form a mixture comprising a hydrolyzed titanated support wherein a weight ratio of the amount of aqueous alkaline solution to the amount of titanium(IV) alkoxide in the dried titanated support is from about 30:1 to about 3:1; and e) removing the hydrolyzed titanated support from the mixture comprising the hydrolyzed titanated support and drying the hydrolyzed titanated support by heating to a temperature in a range of from about 50° C. to about 200° C. and maintaining the temperature in the range of from about 50° C. to about 200° C. for a time period of from about 30 minutes to about 6 hours to form the hydrolyzed pre-catalyst. The method may further comprise contacting a chromium-containing compound and the hydrolyzed pre-catalyst to form a pre-catalyst and calcining the pre-catalyst by heating to a temperature in a range of from about 400° C. to about 1000° C. and maintaining the temperature in the range of from about 400° C. to about 1000° C. for a time period of from about 1 minute to about 24 hours to form a catalyst.

Also disclosed herein is a method of preparing a hydrolyzed pre-catalyst comprising a) drying a silica support by heating to a temperature in a range of from about 150° C. to about 250° C. and maintaining the temperature in the range of from about 150° C. to about 250° C. for a time period of from about 1 hour to about 24 hours to form a dried support; b) contacting the dried support and a titanium(IV) alkoxide to form a titanated support; c) heating the titanated support to a temperature in a range of from about 50° C. to about 200° C. and maintaining the temperature in the range of from about 50° C. to about 200° C. while contacting the titanated support and an alkaline material for a time period of from about 2 hours to about 48 hours; d) ceasing contacting of the titanated support and the alkaline material to provide a hydrolyzed support having a temperature in a range of from about 50° C. to about 200° C.; and e) maintaining the temperature in the range of from about 50° C. to about 200° C. for a time period of from about 30 minutes to about 6 hours to form the hydrolyzed pre-catalyst. The method may further comprise contacting a chromium-containing compound and the hydrolyzed pre-catalyst and to form a pre-catalyst and calcining the pre-catalyst by heating to a temperature in a range of from about 400° C. to about 1000° C. and maintaining the temperature in the range of from about 400° C. to about 1000° C. for a time period of from about 1 minute to about 24 hours to form a catalyst.

Also disclosed herein is a method of preparing a catalyst comprising a) drying a chrominated-silica support by heating to a temperature in a range of from about 150° C. to about 250° C. and maintaining the temperature in the range of from about 150° C. to about 250° C. for a time period of from about 1 hour to about 24 hours to form a dried chrominated-silica support; b) contacting the dried chrominated-silica support and a titanium(IV) alkoxide to form a metalized support; c) drying the metalized support by heating to a temperature in a range of from about 50° C. to about 200° C. and maintaining the temperature in the range of from about 50° C. to about 200° C. for a time period of from about 30 minutes to about 6 hours to form a dried metalized support; d) contacting the dried metalized support and an aqueous alkaline solution comprising from about 3 wt. % to about 20 wt. % of a nitrogen-containing compound for a time period of from about 10 minutes to about 6 hours to form a mixture comprising a hydrolyzed metalized support wherein a weight ratio of the amount of aqueous alkaline solution to the amount of titanium(IV) alkoxide in the dried metalized support is from about 30:1 to about 3:1; e) removing the hydrolyzed metalized support from the mixture comprising the hydrolyzed metalized support and drying the hydrolyzed metalized support by heating to a temperature in a range of from about 50° C. to about 200° C. and maintaining the temperature in the range of from about 50° C. to about 200° C. for a time period of from about 30 minutes to about 6 hours to form a pre-catalyst; and f)

calcining the pre-catalyst by heating to a temperature in a range of from about 400° C. to about 1000° C. and maintaining the temperature in the range of from about 400° C. to about 1000° C. for a time period of from about 1 minute to about 24 hours to form the catalyst.

Also disclosed herein is a method of preparing a catalyst comprising a) drying a silica support by heating to a temperature in a range of from about 150° C. to about 250° C. and maintaining the temperature in the range of from about 150° C. to about 250° C. for a time period of from about 1 hour to about 24 hours to form a dried support; b) contacting the dried support and a titanium(IV) alkoxide to form a titanated support; c) drying the titanated support by heating to a temperature in a range of from about 50° C. to about 200° C. and maintaining the temperature in the range of from about 50° C. to about 200° C. for a time period of from about 30 minutes to about 6 hours to form a dried titanated support; d) contacting the dried titanated support and an aqueous alkaline solution comprising from about 3 wt. % to about 20 wt. % of a nitrogen-containing compound for a time period of from about 10 minutes to about 6 hours to form a mixture comprising a hydrolyzed titanated support wherein a weight ratio of the amount of aqueous alkaline solution to the amount of titanium(IV) alkoxide in the dried titanated support is from about 30:1 to about 3:1; e) removing the hydrolyzed titanated support from the mixture comprising the hydrolyzed titanated support and drying the hydrolyzed titanated support by heating to a temperature in a range of from about 50° C. to about 200° C. and maintaining the temperature in the range of from about 50° C. to about 200° C. for a time period of from about 30 minutes to about 6 hours to form a hydrolyzed pre-catalyst; f) contacting, to form a pre-catalyst, a chromium-containing compound and at least one material selected from the group consisting of the silica support, the dried support, the titanated support, the dried titanated support, the mixture comprising the hydrolyzed titanated support, and the hydrolyzed pre-catalyst; and g) calcining the pre-catalyst by heating to a temperature in a range of from about 400° C. to about 1000° C. and maintaining the temperature in the range of from about 400° C. to about 1000° C. for a time period of from about 1 minute to about 24 hours to form the catalyst.

Also disclosed herein is a method of preparing a catalyst comprising a) drying a chrominated-silica support by heating to a temperature in a range of from about 150° C. to about 250° C. and maintaining the temperature in the range of from about 150° C. to about 250° C. for a time period of from about 1 hour to about 24 hours to form a dried chrominated-silica support; b) contacting the dried chrominated-silica support and a titanium(IV) alkoxide to form a metalized support; c) heating the metalized support to a temperature in a range of from about 50° C. to about 200° C. and maintaining the temperature in the range of from about 50° C. to about 200° C. while contacting the metalized support and a gas-phase solution material for a time period of from about 2 hours to about 48 hours; d) ceasing contacting of the metalized support and the gas-phase solution to provide a hydrolyzed metalized support having a temperature in a range of from about 50° C. to about 200° C.; e) maintaining the temperature of the hydrolyzed metalized support in the range of from about 50° C. to about 200° C. for a time period of from about 30 minutes to about 6 hours to form a pre-catalyst; and f) calcining the pre-catalyst by heating to a temperature in a range of from about 400° C. to about 1000° C. and maintaining the temperature in the range of from about 400° C. to about 1000° C. for a time period of from about 1 minute to about 24 hours to form the catalyst.

Also disclosed herein is a method of preparing a catalyst comprising a) drying a silica support by heating to a temperature in a range of from about 150° C. to about 250° C. and maintaining the temperature in the range of from about 150° C. to about 250° C. for a time period of from about 1 hour to about 24 hours to form a dried support; b) contacting the dried support and a titanium(IV) alkoxide to form a titanated support; c) heating the titanated support to a temperature in a range of from about 50° C. to about 200° C. and maintaining the temperature in the range of from about 50° C. to about 200° C. while contacting the titanated support and a gas-phase solution for a time period of from about 2 hours to about 48 hours; d) ceasing contacting of the titanated support and the gas-phase solution to provide a hydrolyzed support having a temperature in a range of from about 50° C. to about 200° C.; e) maintaining the temperature in the range of from about 50° C. to about 200° C. for a time period of from about 30 minutes to about 6 hours to form a hydrolyzed pre-catalyst; f) contacting, to form a pre-catalyst, a chromium-containing compound and at least one material selected from the group consisting of the silica support, the dried support, the titanated support, the hydrolyzed support, and the hydrolyzed pre-catalyst; and g) calcining the pre-catalyst by heating to a temperature in a range of from about 400° C. to about 1000° C. and maintaining the temperature in the range of from about 400° C. to about 1000° C. for a time period of from about 1 minute to about 24 hours to form the catalyst.

BRIEF DESCRIPTION OF THE FIGURE

The following FIGURE forms part of the present specification and is included to further demonstrate certain aspects of the present disclosure. The subject matter of the present disclosure may be better understood by reference to the FIGURE in combination with the detailed description of specific aspects presented herein.

The FIGURE illustrates a reaction of a silica support with $Ti(OiPr)_4$.

DETAILED DESCRIPTION

The present disclosure encompasses olefin polymerization catalysts, methods of preparing olefin polymerization catalysts, and methods of utilizing olefin polymerization catalysts. In an aspect, a method of the present disclosure comprises contacting a silica support or a chrominated-silica support (i.e., support), with titanium to produce a Cr/Si—Ti catalyst. The methodologies disclosed herein contemplate application of an alkaline treatment (e.g., via contact with a nitrogen-containing compound) during preparation of the Cr/Si—Ti catalyst to facilitate the association of titanium with the support. The methodologies further contemplate that application of the alkaline treatment may reduce the emissions of highly reactive volatile organic compounds created during production the Cr/Si—Ti catalyst. While these aspects may be disclosed under a particular heading, the heading does not limit the disclosure found therein. Additionally, the various aspects and embodiments disclosed herein can be combined in any manner.

The methodologies disclosed herein contemplate application of an alkaline treatment, for example via contact with a nitrogen-containing compound. In an aspect, a method of preparation of an olefin polymerization catalyst disclosed herein comprises utilization of an aqueous alkaline solution comprising the nitrogen-containing compound. In a particular aspect, the aqueous alkaline solution comprises water and a nitrogen-containing compound. In some aspects, the aqueous alkaline solution optionally comprises a co-solvent.

Water suitable for use in the aqueous alkaline solution may be deionized water, distilled water, filtered water, or a combination thereof.

In an aspect, an aqueous alkaline solution of the present disclosure comprises a nitrogen-containing compound. The nitrogen-containing compound may be any nitrogen-containing compound suitable for providing effective titanation of the olefin polymerization catalyst. In a further aspect, the nitrogen-containing compound may have Structure 1, Structure 2, Structure 3, Structure 4, or a combination thereof.

$N(R^1)_3$         Structure 1

$N(R^2)_4OH$         Structure 2

$N(R^3)_2OH$         Structure 3

Structure 4

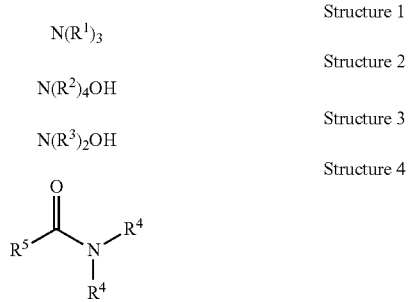

$R^1$, $R^2$, $R^3$, $R^4$, $R^5$, x, y, and z within a nitrogen-containing compound utilized as described herein are independent elements of the nitrogen-containing compound structure in which they are present and are independently described herein. The independent descriptions of $R^1$, $R^2$, $R^3$, $R^4$, $R^5$, x, y, and/or z provided herein can be utilized without limitation, and in any combination, to further describe any nitrogen-containing compound structure which comprises an $R^1$, $R^2$, $R^3$, $R^4$, $R^5$, x, y, and/or z Generally, $R^1$, $R^2$, $R^3$, $R^4$, and/or $R^5$ of a respective nitrogen-containing compound which has an $R^1$, $R^2$, $R^3$, $R^4$, and/or $R^5$ may each independently be hydrogen, an organyl group, a hydrocarbyl group, or an aryl group. In an aspect, $R^1$, $R^2$, $R^3$, $R^4$, and/or $R^5$ may each independently be a $C_1$ to $C_{30}$ organyl group; alternatively, a $C_1$ to $C_{12}$ organyl group; or alternatively, a $C_1$ to $C_6$ organyl group. In a further aspect, $R^1$, $R^2$, $R^3$, $R^4$, and/or $R^5$ may each independently be a $C_1$ to $C_{30}$ hydrocarbyl group; alternatively, a $C_1$ to $C_{12}$ hydrocarbyl group; or alternatively, a $C_1$ to $C_6$ hydrocarbyl group. In yet other aspects, $R^1$, $R^2$, $R^3$, $R^4$, and/or $R^5$ may each independently be a $C_6$ to $C_{30}$ aryl group; or alternatively, a $C_6$ to $C_{12}$ aryl group. In a further aspect, any organyl group, hydrocarbyl group, or aryl group which may be used as $R^1$, $R^2$, $R^3$, $R^4$, and/or $R^5$ within the nitrogen-containing compound of the present disclosure may be substituted or non-substituted. It will be understood by one skilled in the art that the terms "alkyl", "hydrocarbyl", "organyl", and "aryl" are used herein in accordance with the definitions from the IUPAC Compendium of Chemical Terminology, $2^{nd}$ Ed (1997).

In a particular aspect, any substituted organyl group, substituted hydrocarbyl group, or substituted aryl group which may be used as $R^1$, $R^2$, $R^3$, $R^4$, and/or $R^5$ may contain one or more non-hydrogen substituents. The non-hydrogen substituents suitable for use herein may be a halogen, a $C_1$ to $C_{12}$ hydrocarbyl group, a $C_1$ to $C_{12}$ hydrocarboxy group, or a combination thereof. In an aspect, the halogen utilized as the non-hydrogen substituent may be fluorine, chlorine, bromine, or iodine. Non-limiting examples of the $C_1$ to $C_{12}$ hydrocarboxy group suitable for use herein include a methoxy group, an ethoxy group, a propoxy group, a butoxy group, a pentoxy group, a hexoxy group, a phenoxy group, a toloxy group, a xyloxy group, a trimethylphenoxy group, and a benzoxy group.

In still another aspect, a nitrogen-containing compound of the present disclosure having Structure 1 comprises three $R^1$ groups wherein each of the three $R^1$ groups may have independent values. In an aspect, a nitrogen-containing compound having Structure 2 comprises four $R^2$ groups wherein each of the four $R^2$ groups may have independent values. In yet a further aspect, a nitrogen-containing compound having Structure 3 comprises two $R^3$ groups wherein each of the two $R^3$ groups may have independent values. In a further aspect, a nitrogen-containing compound having Structure 4 comprises two $R^4$ groups wherein each of the two $R^4$ groups may have independent values.

In an aspect, a nitrogen-containing compound suitable for use in the present disclosure may be an amide, an amidine, an amine, a diamine, a triamine, an amino acid, an ammonium hydroxide, a formamide, a hydrazine, a hydroxylamine, an imidazole, a piperazine, a piperidine, a pyrazine, a pyrazole, a pyridine, a pyrimidine, a pyrrole, a urea, or a combination thereof. In a further aspect, the amide, the amidine, the amine, the diamine, the triamine, the amino acid, the ammonium hydroxide, the formamide, the hydrazine, the hydroxylamine, the imidazole, the piperazine, the piperidine, the pyrazine, the pyrazole, the pyridine, the pyrimidine, the pyrrole, and/or the urea used as the nitrogen-containing compound may contain one or more substituent groups. In an aspect, any substituent group contained within any nitrogen-containing compound of the present disclosure may be a halogen, a $C_1$ to $C_{12}$ organyl group, a $C_1$ to $C_{12}$ hydrocarbyl group, a $C_1$ to $C_{12}$ hydrocarboxy group, or a combination thereof. The halogen utilized as the substituent group of any aspect disclosed herein may be fluorine, chlorine, bromine, or iodine. Non-limiting examples of the $C_1$ to $C_{12}$ hydrocarboxy group suitable for use as the substituent group include a methoxy group, an ethoxy group, a propoxy group, a butoxy group, a pentoxy group, a hexoxy group, a phenoxy group, a toloxy group, a xyloxy group, a trimethylphenoxy group, and a benzoxy group.

In a further aspect, non-limiting examples of specific nitrogen-containing compounds suitable for use in the present disclosure include ammonia, ammonium hydroxide, tetraethylammonium hydroxide, tetramethylammonium hydroxide, hydrazine, hydroxylamine, trimethyl amine, triethyl amine, acetamide, creatine, 1,4-diazabicyclo[2.2.2]octane (DABCO), 1,5-diazabicyclo[4.3.0]non-5-ene (DBN), 1,8-diazabicyclo[5.4.0]undec-7-ene (DBU), N,N-diisopropylethylamine (DIPEA), dimethyl carbamate, formamide, methyl formamide, dimethyl formamide, dimethyl glycine, 1,4-dimethylpiperazine (DMP), 1,3-dimethyl urea, imidazole, piperazine, piperidine, pyrazine, pyrazole, pyridine, pyrimidine, pyrrole, tetramethylethylenediamine (TMEDA), triazine, 1,3,5-triazacyclohexane, 1,3,5-trimethyl-1,3,5-triazacyclohexane (TMTAC), or a combination thereof.

In yet a further aspect, an aqueous alkaline solution of the present disclosure may optionally comprise a co-solvent. In an aspect, the co-solvent suitable for use herein may be an organic solvent such as an alcohol, an ester, a ketone, or a combination thereof. Non-limiting examples of alcohols suitable for use as the co-solvent include methanol, ethanol, n-propanol, isopropanol, n-butanol, isobutanol, or a combination thereof. Non-limiting examples of esters suitable for use as the co-solvent include ethyl acetate, propyl acetate, butyl acetate, isobutyl isobutyrate, methyl lactate, ethyl lactate, or a combination thereof. Non-limiting examples of ketones suitable for use as the co-solvent include acetone, ethyl methyl ketone, methyl isobutyl ketone, or a combination thereof.

In an aspect, an amount of a nitrogen-containing compound present in the aqueous alkaline solution may be in a range of from about 1 wt. % to about 50 wt. %; alternatively, from about 3 wt. % to about 20 wt. %; or alternatively, from about 4 wt. % to about 10 wt. % based upon the total weight of the aqueous alkaline solution. In aspects where the aqueous alkaline solution comprises a co-solvent, a volumetric ratio of co-solvent to water may be in a range of from about 1:20 to about 20:1; alternatively, from about 1:10 to about 10:1; alternatively, from about 1:5 to about 5:1; or alternatively, from about 1:2 to about 2:1. The remainder of the aqueous alkaline solution comprises water as disclosed herein.

In a still further aspect, a method of preparation of an olefin polymerization catalyst disclosed herein contemplates application of an alkaline treatment, for example via utilization of a gas-phase mixture comprising a nitrogen containing compound. In an aspect, the gas-phase mixture comprises a vapor associated with a basic liquid (e.g., a vapor in equilibrium with the basic liquid). In a particular aspect, the basic liquid comprises an aqueous solution of a nitrogen-containing compound disclosed herein. In a further aspect, the basic liquid comprises an alcohol, non-limiting examples of which include methanol, ethanol, n-propanol, isopropanol, or a combination thereof.

In an aspect, an amount of nitrogen-containing compound in the aqueous solution is from about 3 wt. % to about 20 wt. % based upon the total weight of the aqueous solution. In a further aspect the basic liquid comprises a volumetric ratio of the aqueous solution to the alcohol in a range of from 10:1 to about 1:10; alternatively, from about 4:1 to about 1:4; alternatively, from about 7:3 to about 3:7; or alternatively, from about 1.2:1 to about 1:1.2.

In a particular aspect, the basic liquid and the vapor associated with the basic liquid may each independently have a temperature in a range of from about 120° C. to about 200° C.; or alternatively, from about 150° C. to about 170° C.

In a still further aspect, a gas-phase mixture suitable for use herein comprises a vapor associated with a basic liquid comprising MeOH and an aqueous solution of $NH_4OH$. In a further aspect the gas-phase mixture comprises ammonia, methanol, water, or a combination thereof. In an aspect, an amount of $NH_4OH$ present in the aqueous solution may be in a range of from about 2 wt. % to about 10 wt. % based upon the total weight of the aqueous solution. In a further aspect, the basic liquid comprises a volumetric ratio of MeOH to the aqueous solution in a range of from 10:1 to about 1:10; or alternatively, from about 7:3 to about 3:7. In a further aspect, the basic liquid and the vapor associated with the basic liquid may each independently have a temperature in a range of from about 150° C. to about 170° C.

In a particular aspect, an olefin polymerization catalyst of the present disclosure comprises titanium. The source of the titanium may be any titanium-containing compound capable of providing effective titanation to the olefin polymerization catalyst. In a further aspect, the titanium-containing compound comprises a tetravalent titanium (Ti(IV)) compound or a trivalent titanium (Ti(III)) compound. The Ti(IV) compound may be any compound that comprises Ti(IV); alternatively, the Ti(IV) compound may be any compound that is able to release a Ti(IV) species upon dissolving into solution. The Ti(III) compound may be any compound that comprises Ti(III); alternatively, the Ti(III) compound may be any compound that is able to release a Ti(III) species upon dissolving into solution.

In an aspect, the titanium-containing compound suitable for use in the present disclosure comprises a Ti(IV) compound having at least one alkoxide group; or alternatively, at least two alkoxide groups. Ti(IV) compounds suitable for use in the present disclosure include, but are not limited to, Ti(IV) compounds that have the general formula $TiO(OR^6)_2$, $Ti(OR^6)_2(acac)_2$, $Ti(OR^6)_2(oxal)$, a combination thereof wherein $R^6$ may be ethyl, isopropyl, n-propyl, isobutyl, n-butyl, or a combination thereof; "acac" is acetylacetonate; and "oxal" is oxalate. Alternatively, the titanium-containing compound comprises a titanium(IV) alkoxide. In an aspect, the titanium(IV) alkoxide may be titanium(IV) ethoxide, titanium(IV) isopropoxide, titanium(IV) n-propoxide, titanium(IV) n-butoxide, titanium(IV) 2-ethylhexoxide, or a combination thereof. In a particular aspect, the titanium-containing compound may be titanium(IV) isopropoxide.

In yet another aspect, the titanium-containing compound suitable for use in the present disclosure may comprise a titanium(IV) halide, non-limiting examples of which include titanium(IV) chloride and titanium(IV) bromide.

An amount of titanium present in an olefin polymerization catalyst may range from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. %. titanium based upon a total weight of the olefin polymerization catalyst. In another aspect, the amount of titanium present in the olefin polymerization catalyst may range from about 1 wt. % to about 5 wt. % titanium based upon the total weight of the olefin polymerization catalyst. Herein, a titanium percentage refers to a weight percent (wt. %), of titanium associated with the olefin polymerization catalyst based upon the total weight of the olefin polymerization catalyst after completion of all processing steps (i.e., after activation via calcination).

In a further aspect, a weight ratio of the amount of aqueous alkaline solution to the amount of titanium-containing compound utilized to prepare an olefin polymerization catalyst disclosed herein may be in a range of from about 100:1 to about 1:1; or alternatively, from about 30:1 to about 3:1. Alternatively, an amount of aqueous alkaline solution utilized is sufficient to provide an equivalent molar ratio of nitrogen-containing compound to titanium-containing compound in a range of from about 100:1 to about 1:2; alternatively, from about 50:1 to about 1:1; or alternatively, from about 20:1 to about 3:1. In an aspect, a weight ratio of an aqueous alkaline solution to water is from about 100:1 to about 1:1.

In another aspect, an olefin polymerization catalyst of the present disclosure comprises a silica support. The silica support may be any silica support suitable for preparation of the olefin polymerization catalyst as disclosed herein. The silica support may have a surface area and a pore volume effective to provide for the production of an active olefin polymerization catalyst. In an aspect of the present disclosure, the silica support possesses a surface area in a range of from about 100 $m^2$/gram to about 1000 $m^2$/gram; alternatively, from about 250 $m^2$/gram to about 1000 $m^2$/gram; alternatively, from about 250 $m^2$/gram to about 700 $m^2$/gram; alternatively, from about 250 $m^2$/gram to about 600 $m^2$/gram; or alternatively, greater than about 250 m²/gram. The silica support may be further characterized by a pore volume of greater than about 0.9 cm³/gram; alternatively, greater than about 1.0 cm³/gram; or alternatively, greater than about 1.5 cm³/gram. In an aspect of the present disclosure, the silica support is characterized by a pore volume in a range of from about 1.0 cm³/gram to about 2.5 cm³/gram. The silica support may be further characterized by an average particle size in a range of from about 10 microns to about 500 microns; alternatively, about 25 microns to about 300 microns; or alternatively, about 40 microns to about 150 microns. Generally, an average pore size of the silica support may be in a range of from about 10 Angstroms to about 1000 Angstroms. In one aspect of the present disclosure, the average pore size of the silica support is in a range of from about 50 Angstroms to about 500 Angstroms; or alternatively, from about 75 Angstroms to about 350 Angstroms.

The silica support suitable for use in the present disclosure may contain greater than about 50 wt. % silica; alternatively, greater than about 80 wt. % silica; or alternatively, greater than about 95 wt. % silica based upon the total weight of the silica support. The silica support may be prepared using any suitable method, e.g., the silica support may be prepared by hydrolyzing tetrachlorosilane ($SiCl_4$), with water or by contacting sodium silicate and a mineral acid. The silica support may include additional components that do not adversely affect the catalyst, such as zirconia, alumina, thoria, magnesia, fluoride, sulfate, phosphate, or a combination thereof. Non-limiting examples of silica supports suitable for use in this disclosure include ES70, which is a silica support material with a surface area of 300 m²/gram and a pore volume of 1.6 cm³/gram, that is commercially available from PQ Corporation and V398400, which is a silica support material that is commercially available from Evonik.

In a particular aspect of the present disclosure, a silica support suitable for use in the present disclosure comprises chromium. The silica support comprising chromium may be termed a chrominated-silica support. In another aspect, the chrominated-silica support comprises the characteristics disclosed herein for the silica support while additionally containing chromium. A non-limiting example of the chrominated-silica support is HW30A, which is a chrominated-silica support material that is commercially available from W. R. Grace and Company.

The silica support may be present in the olefin polymerization catalyst in an amount in a range of from about 50 wt. % to about 99 wt. %; or alternatively, from about 80 wt. % to about 99 wt. %. Herein a silica support percentage refers to a weight percent (wt. %), of the silica support associated with the olefin polymerization catalyst based upon a total weight of the olefin polymerization catalyst after completion of all processing steps (i.e., after activation via calcination).

In a still further aspect, an olefin polymerization catalyst of the present disclosure comprises chromium. The source of chromium may be any chromium-containing compound capable of providing a sufficient amount of chromium to the olefin polymerization catalyst. In an aspect, the chromium-containing compound may be a water-soluble chromium compound or a hydrocarbon-soluble chromium compound. Examples of water-soluble chromium compounds include chromium trioxide, chromium acetate, chromium nitrate, or a combination thereof. Examples of hydrocarbon-soluble chromium compounds include tertiary butyl chromate, bis-cyclopentadienyl chromium(II), chromium(III) acetylacetonate, or a combination thereof. In one aspect of the present disclosure, the chromium-containing compound may be a chromium(II) compound, a chromium(III) compound, or a combination thereof. Suitable chromium(III) compounds include, but are not limited to, chromium(III) carboxylates, chromium(III) naphthanates, chromium(III) halides, chromium(III) sulfates, chromium(III) nitrates, chromium(III) dionates, or a combination thereof. Specific chromium(III) compounds include, but are not limited to, chromium(III) sulfate, chromium(III) chloride, chromium(III) nitrate, chromium(III) bromide, chromium(III) acetylacetonate, and chromium(III) acetate. Suitable chromium(II) compounds include, but are not limited to, chromium(II) chloride, chromium(II) bromide, chromium(II) iodide, chromium(II) sulfate, chromium(II) acetate, or a combination thereof.

An amount of chromium present in an olefin polymerization catalyst may be in a range of from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % chromium based upon a total weight of the olefin polymerization catalyst. In another aspect, the amount of chromium present in the olefin polymerization catalyst may be in a range of from about 1 wt. % to about 5 wt. % chromium based upon the total weight of the olefin polymerization catalyst. Herein, a chromium percentage refers to a weight percent (wt. %), of chromium associated with the olefin polymerization catalyst based upon the total weight of the olefin polymerization catalyst after completion of all processing steps (i.e., after activation via calcination).

In yet a further aspect, one or more components of an olefin polymerization catalyst of the present disclosure may be contacted in the presence of a solvent. In a particular aspect, the solvent suitable for use may be a hydrocarbon, an alcohol, an organic solvent, an aqueous solvent, or a combination thereof. In an aspect, the hydrocarbon suitable for use as the solvent may be an aliphatic hydrocarbon, a halogenated aliphatic hydrocarbon, an aromatic hydrocarbon, a halogenated aromatic hydrocarbon, or a combination thereof. Non-limiting examples of the hydrocarbon suitable for use as the solvent include benzene, chloroform, carbon tetrachloride, chlorobenzene, dichlorobenzene, dichloroethane, ethylbenzene, hexane, heptane, methylene chloride, octane, trichloroethane, toluene, xylenes, or a combination thereof. In a further aspect, a hydrocarbon solvent suitable for use in the present disclosure comprises heptane. Non-limiting examples of alcohols suitable for use as the solvent include methanol, ethanol, n-propanol, isopropanol, n-butanol, isobutanol, pentanol, hexanol, cyclohexanol, heptanol, octanol, benzyl alcohol, phenol, or a combination thereof. In a further aspect, the organic solvent suitable for use in the present disclosure may be an ester, a ketone, or a combination thereof. Non-limiting examples of esters suitable for use as the solvent include ethyl acetate, propyl acetate, butyl acetate, isobutyl isobutyrate, methyl lactate, ethyl lactate, or a combination thereof. Non-limiting examples of ketones suitable for use as the solvent include acetone, ethyl methyl ketone, methyl isobutyl ketone, or a combination thereof.

In an aspect of the present disclosure the catalyst components disclosed herein may be contacted in any order or fashion deemed suitable to one skilled in the art with the aid of the present disclosure to produce an olefin polymerization catalyst having the characteristics disclosed herein.

In an aspect, a method for preparation of an olefin polymerization catalyst comprises drying a silica support prior to contact with any other component of the olefin polymerization catalyst to form a dried support. The silica support may be dried by heating to a temperature in a range of from about 110° C. to about 500° C.; alternatively, from about 150° C. to about 300° C.; or alternatively, from about 150° C. to about 250° C. The method further comprises maintaining the temperature of the silica support in the range of from about 110° C. to about 500° C.; alternatively, from about 150° C. to about 300° C.; or alternatively, from about 150° C. to about 250° C. for a time period of from about 1 hour to about 24 hours; alternatively, from about 5 hours to about 24 hours; or alternatively, from about 5 hours to about 12 hours to form the dried support. Drying of the silica support may be conducted in an inert atmosphere (e.g., under vacuum, He, Ar, or $N_2$ gas). A dryness of the dried support may be measured as a loss in weight upon drying at a temperature of about 250° C. for a time period of from about 1 hour to about 12 hours. In an aspect, the loss in weight upon drying of the dried support is less than about 3 wt. %; alternatively, less than about 2 wt. %; or alternatively, less than about 1 wt. %.

The method may further comprise contacting the dried support and a titanium-containing compound of the type disclosed herein to form a titanated support. The titanated support may be dried by heating to a temperature in a range of from about 50° C. to about 500° C.; alternatively, from about 50° C. to about 200° C.; or alternatively, from about 80° C. to about 150° C. The method further comprises maintaining the temperature of the titanated support in the range of from about 50° C. to about 500° C.; alternatively, from about 50° C. to about 200° C.; or alternatively, from about 80° C. to about 150° C. for a time period of from about 30 minutes to about 24 hours; alternatively, from about 30 minutes to about 6 hours; or alternatively, from about 2 hours to about 6 hours to form a dried titanated support. The method may further comprise contacting the dried titanated support and an aqueous alkaline solution of the type disclosed herein to form a mixture comprising a hydrolyzed titanated support. In yet another aspect, the dried titanated support and the aqueous alkaline solution may be contacted for a time period of from about 1 minute to about 24 hours; alternatively, from about 10 minutes to about 6 hours; or alternatively, from about 1 hour to about 3 hours. In an aspect, the mixture formed by contacting the dried titanated support and the aqueous alkaline solution may be a slurry, a suspension, a colloid, or a combination thereof. The method further comprises removing the hydrolyzed titanated support from the mixture comprising the hydrolyzed titanated support. In an aspect, the hydrolyzed titanated support may be removed by any suitable methodology, non-limiting examples of which include filtration, centrifugation, gravimetric settling, membrane filtration, or a combination thereof. The method may further comprise drying the hydrolyzed titanated support by heating to a temperature in a range of from about 35° C. to about 500° C.; alternatively, from about 50° C. to about 200° C.; or alternatively, from about 75° C. to about 125° C. The method further comprises maintaining the temperature of the hydrolyzed titanated support in the range of from about 35° C. to about 500° C.; alternatively, from about 50° C. to about 200° C.; or alternatively, from about 75° C. to about 125° C. for a time period of from about 5 minutes to about 24 hours; alternatively, from about 30 minutes to about 12 hours; alternatively, from about 30 minutes to about 6 hours; or alternatively, from about 1 hour to about 3 hours to form a hydrolyzed pre-catalyst.

In a further aspect, a method for preparation of an olefin polymerization catalyst comprises preparing a dried chrominated-silica support. The method may comprise contacting a chromium-containing compound and a silica support, both of the type disclosed herein, to form a chrominated-silica support that is subsequently dried by heating to a temperature in a range of from about 110° C. to about 500° C.; alternatively, from about 150° C. to about 300° C.; or alternatively, from about 150° C. to about 250° C. The method may further comprise maintaining the temperature of the chrominated-silica support in the range of from about 110° C. to about 500° C.; alternatively, from about 150° C. to about 300° C.; or alternatively, from about 150° C. to about 250° C. for a time period of from about 30 minutes to about 24 hours; alternatively, from about 30 minutes to about 6 hours; or alternatively, from about 2 hours to about 6 hours to form the dried chrominated-silica support. In an alternative aspect, the chromium-containing compound and a dried support may be contacted to form the dried chrominated-silica support. In a further alternative aspect, a chrominated-silica support as disclosed herein (e.g., HA30W), is dried by heating to a temperature in a range of from about 110° C. to about 500° C.; alternatively, from about 150° C. to about 300° C.; or alternatively, from about 150° C. to about 250° C. and maintaining the temperature of the chrominated-silica support in the range of from about 110° C. to about 500° C.; alternatively, from about 150° C. to about 300° C.; or alternatively, from about 150° C. to about 250° C. for a time period of from about 30 minutes to about 24 hours; alternatively, from about 30 minutes to about 6 hours; or alternatively, from about 2 hours to about 6 hours to form the dried chrominated-silica support. Drying of the chrominated-silica support may be conducted in an inert atmosphere (e.g., under vacuum, He, Ar, or $N_2$ gas). A dryness of the dried chrominated-silica support may be measured as a loss in weight upon drying at a temperature of about 250° C. for a time period of from about 1 hour to about 12 hours. In an aspect, the loss in weight upon drying of the dried chrominated-silica support is less than about 3 wt. %; alternatively, less than about 2 wt. %; or alternatively, less than about 1 wt. %.

The method further comprises contacting the dried chrominated-silica support and a titanium-containing compound of the type disclosed herein to form a metalized support that may subsequently be dried by heating to a temperature in a range of from about 50° C. to about 500° C.; alternatively, from about 50° C. to about 200° C.; or alternatively, from about 80° C. to about 150° C. The method further comprises maintaining the temperature of the metalized support in the range of from about 50° C. to about 500° C.; alternatively, from about 50° C. to about 200° C.; or alternatively, from about 80° C. to about 150° C. for a time period of from about 30 minutes to about 24 hours; alternatively, from about 30 minutes to about 6 hours; or alternatively, from about 2 hours to about 6 hours to form a dried metalized support. In an aspect, the method may further comprise contacting the dried metalized support and an aqueous alkaline solution of the type disclosed herein to form a mixture comprising a hydrolyzed metalized support. In an aspect, the dried metalized support and the aqueous alkaline solution may be contacted for a time period of from about 1 minute to about 24 hours and the mixture formed thereby may be a slurry, a suspension, a colloid, or a combination thereof. The method further comprises removing the hydrolyzed metalized support from the mixture comprising the hydrolyzed metalized support by any suitable methodology, non-limiting examples of which include filtration, centrifugation, gravimetric settling, membrane filtration, or a combination thereof. The method may further comprise drying the hydrolyzed metalized support by heating to a temperature in a range of from about 35° C. to about 500° C.; alternatively, from about 50° C. to about 200° C.;

or alternatively, from about 75° C. to about 125° C. and maintaining the temperature of the hydrolyzed metalized support in the range of from about 35° C. to about 500° C.; alternatively, from about 50° C. to about 200° C.; or alternatively, from about 75° C. to about 125° C. for a time period of from about 5 minutes to about 24 hours; alternatively, from about 30 minutes to about 12 hours; alternatively, from about 30 minutes to about 6 hours; or alternatively, from about 1 hour to about 3 hours to form a pre-catalyst.

In an alternative aspect, a method for preparation of an olefin polymerization catalyst comprises contacting a chromium-containing compound and a titanated support to form a metalized support that is subsequently dried to form a dried metalized support. The dried metalized support may be contacted with an aqueous alkaline solution to form a mixture comprising a hydrolyzed metalized support. The hydrolyzed metalized support may be removed from the mixture comprising the hydrolyzed metalized support and dried to form a pre-catalyst.

In a further alternative aspect, the chromium-containing compound and a dried titanated support are contacted to form the dried metalized support that is subsequently contacted with the aqueous alkaline solution to form a mixture comprising the hydrolyzed metalized support. The hydrolyzed metalized support may be removed from the mixture comprising the hydrolyzed metalized support and dried to form the pre-catalyst.

In yet a further alternative aspect, the chromium-containing compound and a mixture comprising a hydrolyzed titanated support prepared with the aqueous alkaline solution are contacted to form a mixture comprising a hydrolyzed metalized support. The hydrolyzed metalized support may be removed from the mixture comprising the hydrolyzed metalized support and dried to form the pre-catalyst.

In yet another alternative aspect, the chromium-containing compound and a hydrolyzed pre-catalyst prepared with the aqueous alkaline solution are contacted to form the pre-catalyst.

In a particular aspect, a method for preparation of an olefin polymerization catalyst comprises drying a silica support prior to contact with any other component of the olefin polymerization catalyst to form a dried support. The silica support may be dried by heating to a temperature in a range of from about 110° C. to about 500° C.; alternatively, from about 150° C. to about 300° C.; or alternatively, from about 150° C. to about 250° C. The method further comprises maintaining the temperature of the silica support in the range of from about 110° C. to about 500° C.; alternatively, from about 150° C. to about 300° C.; or alternatively, from about 150° C. to about 250° C. for a time period of from about 1 hour to about 24 hours; alternatively, from about 5 hours to about 24 hours; or alternatively, from about 5 hours to about 12 hours to form the dried support. Drying of the silica support may be conducted in an inert atmosphere (e.g., under vacuum, He, Ar, or $N_2$ gas). A dryness of the dried support may be measured as a loss in weight upon drying at a temperature of about 250° C. for a time period of from about 1 hour to about 12 hours. In an aspect, the loss in weight upon drying of the dried support is less than about 3 wt. %; alternatively, less than about 2 wt. %; or alternatively, less than about 1 wt. %.

The method further comprises contacting the dried support and a titanium-containing compound of the type disclosed herein to form a mixture comprising a titanated support. In an aspect, the mixture comprising the titanated support comprises a solvent suitable for use as disclosed herein (e.g., heptane). The method may further comprise heating the mixture comprising the titanated support to a temperature in a range of from about 35° C. to about 500° C.; alternatively, from about 50° C. to about 200° C.; or alternatively, from about 75° C. to about 125° C. and maintaining the temperature in the range of from about 35° C. to about 500° C.; alternatively, from about 50° C. to about 200° C.; or alternatively, from about 75° C. to about 125° C. The mixture comprising the titanated support during heating may be contacted with a gas-phase mixture for a time period of from about 30 minutes to about 48 hours; alternatively, from about 1 hour to about 24 hours; or alternatively, from about 2 hours to about 8 hours. In an aspect, contacting the mixture comprising the titanated support and the gas-phase mixture comprises maintaining a flow of the gas-phase mixture through the mixture comprising the titanated support. In a non-limiting example, a stream of the gas-phase mixture may be bubbled through the mixture comprising the titanated support. The method further comprises ceasing contacting of the mixture comprising the titanated support and the gas-phase mixture to provide a mixture comprising a hydrolyzed support having a temperature in a range of from about 35° C. to about 500° C.; alternatively, from about 50° C. to about 200° C.; or alternatively, from about 75° C. to about 125° C. The method further comprises drying the hydrolyzed support by maintaining the temperature of the hydrolyzed support in a range of from about 35° C. to about 500° C.; alternatively, from about 50° C. to about 200° C.; or alternatively, from about 75° C. to about 125° C. to form a hydrolyzed pre-catalyst.

In a still further aspect, a method for preparation of an olefin polymerization catalyst comprises preparing a dried chrominated-silica support. The method may comprise contacting a chromium-containing compound and a silica support, both of the type disclosed herein, to form a chrominated-silica support that is subsequently dried by heating to a temperature in a range of from about 110° C. to about 500° C.; alternatively, from about 150° C. to about 300° C.; or alternatively, from about 150° C. to about 250° C. The method may further comprise maintaining the temperature of the chrominated-silica support in the range of from about 110° C. to about 500° C.; alternatively, from about 150° C. to about 300° C.; or alternatively, from about 150° C. to about 250° C. for a time period of from about 30 minutes to about 24 hours; alternatively, from about 30 minutes to about 6 hours; or alternatively, from about 2 hours to about 6 hours to form the dried chrominated-silica support. In an alternative aspect, the chromium-containing compound and a dried support may be contacted to form the dried chrominated-silica support. In a further alternative aspect, a chrominated-silica support as disclosed herein (e.g., HA30W), is dried by heating to a temperature in a range of from about 110° C. to about 500° C.; alternatively, from about 150° C. to about 300° C.; or alternatively, from about 150° C. to about 250° C. and maintaining the temperature of the chrominated-silica support in the range of from about 110° C. to about 500° C.; alternatively, from about 150° C. to about 300° C.; or alternatively, from about 150° C. to about 250° C. for a time period of from about 30 minutes to about 24 hours; alternatively, from about 30 minutes to about 6 hours; or alternatively, from about 2 hours to about 6 hours to form the dried chrominated-silica support. Drying of the chrominated-silica support may be conducted in an inert atmosphere (e.g., under vacuum, He, Ar, or $N_2$ gas). A dryness of the dried chrominated-silica support may be measured as a loss in weight upon drying at a temperature of about 250° C. for a time period of from about 1 hour to about 12 hours. In an aspect, the loss in weight upon drying of the dried chrominated-silica support is less than about 3 wt. %; alternatively, less than about 2 wt. %; or alternatively, less than about 1 wt. %.

The method further comprises contacting the dried chrominated-silica support and a titanium-containing compound of the type disclosed herein to form a mixture comprising a metalized support. In a further aspect, the mixture comprising the metalized support comprises a solvent suitable for use as disclosed herein (e.g., heptane). The method may further comprise heating the mixture comprising the metalized support to a temperature in a range of from about 35° C. to about 500° C.; alternatively, from about 50° C. to about 200° C.; or alternatively, from about 75° C. to about 125° C. and maintaining the temperature in the range of from about 35° C. to about 500° C.; alternatively, from about 50° C. to about 200° C.; or alternatively, from about 75° C. to about 125° C. The mixture comprising the metalized support during heating may be contacted with a gas-phase mixture for a time period of from about 30 minutes to about 48 hours; alternatively, from about 1 hour to about 24 hours; or alternatively, from about 2 hours to about 8 hours. In a further aspect, contacting the mixture comprising the metalized support and the gas-phase mixture comprises maintaining a flow of the gas-phase mixture through the mixture comprising the metalized support. In a non-limiting example, a stream of the gas-phase mixture may be bubbled through the mixture comprising the metalized support. The method further comprises ceasing contacting of the mixture comprising the metalized support and the gas-phase mixture to provide a mixture comprising a hydrolyzed metalized support having a temperature in a range of from about 35° C. to about 500° C.; alternatively, from about 50° C. to about 200° C.; or alternatively, from about 75° C. to about 125° C. The method further comprises drying the hydrolyzed metalized support by maintaining the temperature of the hydrolyzed metalized support in a range of from about 35° C. to about 500° C.; alternatively, from about 50° C. to about 200° C.; or alternatively, from about 75° C. to about 125° C. to form a pre-catalyst.

In an alternative aspect, a method for preparation of an olefin polymerization catalyst comprises contacting a chromium-containing compound and a mixture comprising a titanated support to form a mixture comprising a metalized support. In an aspect, the mixture comprising the titanated support comprises a solvent suitable for use as disclosed herein (e.g., heptane). The mixture comprising the metalized support may be heated and contacted with a gas-phase mixture to provide a mixture comprising a hydrolyzed metalized support. The hydrolyzed metalized support may be dried to form a pre-catalyst.

In a further alternative aspect, the chromium-containing compound and a mixture comprising a hydrolyzed support prepared with the gas-phase mixture are contacted to form the mixture comprising the hydrolyzed metalized support. In an aspect, the hydrolyzed metalized support may be dried to form the pre-catalyst.

In yet another alternative aspect, the chromium-containing compound and a hydrolyzed pre-catalyst prepared with the gas-phase mixture are contacted to form the pre-catalyst.

In a particular aspect, a method for preparation of an olefin polymerization catalyst comprises drying a silica support prior to contact with any other component of the olefin polymerization catalyst to form a dried support. The silica support may be dried by heating to a temperature in a range of from about 110° C. to about 500° C.; alternatively, from about 150° C. to about 300° C.; or alternatively, from about 150° C. to about 250° C. The method further comprises maintaining the temperature of the silica support in the range of from about 110° C. to about 500° C.; alternatively, from about 150° C. to about 300° C.; or alternatively, from about 150° C. to about 250° C. for a time period of from about 1 hour to about 24 hours; alternatively, from about 5 hours to about 24 hours; or alternatively, from about 5 hours to about 12 hours to form the dried support. Drying of the silica support may be conducted in an inert atmosphere (e.g., under vacuum, He, Ar, or $N_2$ gas). A dryness of the dried support may be measured as a loss in weight upon drying at a temperature of about 250° C. for a time period of from about 1 hour to about 12 hours. In an aspect, the loss in weight upon drying of the dried support is less than about 3 wt. %; alternatively, less than about 2 wt. %; or alternatively, less than about 1 wt. %.

The method further comprises contacting the dried support and a titanium-containing compound of the type disclosed herein to form a mixture comprising a titanated support. In a further aspect, the mixture comprising the titanated support comprises a solvent suitable for use as disclosed herein (e.g., heptane). The method may further comprise heating the mixture comprising the titanated support to a temperature in a range of from about 35° C. to about 500° C.; alternatively, from about 50° C. to about 200° C.; or alternatively, from about 75° C. to about 125° C. and maintaining the temperature in the range of from about 35° C. to about 500° C.; alternatively, from about 50° C. to about 200° C.; or alternatively, from about 75° C. to about 125° C. The mixture comprising the titanated support during heating may be contacted with an aqueous alkaline solution for a time period of from about 30 minutes to about 48 hours; alternatively, from about 1 hour to about 24 hours; or alternatively, from about 2 hours to about 8 hours. In an aspect, the aqueous alkaline solution and the mixture comprising the titanated support are insoluble and do not mix upon being contacted wherein being contacted comprises liquid/liquid extraction and optional agitation. The method further comprises ceasing contacting of the mixture comprising the titanated support and the aqueous alkaline solution (e.g., separation of the mixture and the solution), to provide a mixture comprising a hydrolyzed support having a temperature in a range of from about 35° C. to about 500° C.; alternatively, from about 50° C. to about 200° C.; or alternatively, from about 75° C. to about 125° C. The method further comprises drying the hydrolyzed support by maintaining the temperature of the hydrolyzed support in a range of from about 35° C. to about 500° C.; alternatively, from about 50° C. to about 200° C.; or alternatively, from about 75° C. to about 125° C. to form a hydrolyzed pre-catalyst.

In an aspect, a method for preparation of an olefin polymerization catalyst comprises preparing a dried chrominated-silica support. The method may comprise contacting a chromium-containing compound and a silica support, both of the type disclosed herein, to form a chrominated-silica support that is subsequently dried by heating to a temperature in a range of from about 110° C. to about 500° C.; alternatively, from about 150° C. to about 300° C.; or alternatively, from about 150° C. to about 250° C. The method may further comprise maintaining the temperature of the chrominated-silica support in the range of from about 110° C. to about 500° C.; alternatively, from about 150° C. to about 300° C.; or alternatively, from about 150° C. to about 250° C. for a time period of from about 30 minutes to about 24 hours; alternatively, from about 30 minutes to about 6 hours; or alternatively, from about 2 hours to about 6 hours to form the dried chrominated-silica support. In an alternative aspect, the chromium-containing compound and a dried support may be contacted to form the dried chrominated-silica support. In a further alternative aspect, a chrominated-silica support as disclosed herein (e.g., HA30W), is dried by heating to a temperature in a range of from about 110° C. to about 500° C.; alternatively, from about 150° C. to about 300° C.; or alternatively, from about 150° C. to about 250° C. and maintaining the temperature of the chrominated-silica support in the range of from about 110° C. to about 500° C.; alternatively, from about 150° C. to about 300° C.; or alternatively, from about 150° C. to about 250° C. for a time period of from about 30 minutes to about 24 hours; alternatively, from about 30 minutes to about 6 hours; or alternatively, from about 2 hours to about 6 hours to form the dried chrominated-silica support. Drying of the chrominated-silica support may be conducted in an inert atmosphere (e.g., under vacuum, He, Ar, or $N_2$ gas). A dryness of the dried chrominated-silica support may be measured as a loss in weight upon drying at a temperature of about 250° C. for a time period of from about 1 hour to about 12 hours. In an aspect, the loss in weight upon drying of the dried chrominated-silica support is less than about 3 wt. %; alternatively, less than about 2 wt. %; or alternatively, less than about 1 wt. %.

The method further comprises contacting the dried chrominated-silica support and a titanium-containing compound of the type disclosed herein to form a mixture comprising a metalized support. In a further aspect, the mixture comprising the metalized support comprises a solvent suitable for use as disclosed herein (e.g., heptane). The method may further comprise heating the mixture comprising the metalized support to a temperature in a range of from about 35° C. to about 500° C.; alternatively, from about 50° C. to about 200° C.; or alternatively, from about 75° C. to about 125° C. and maintaining the temperature in the range of from about 35° C. to about 500° C.; alternatively, from about 50° C. to about 200° C.; or alternatively, from about 75° C. to about 125° C. The mixture comprising the metalized support during heating may be contacted with an aqueous alkaline solution for a time period of from about 30 minutes to about 48 hours; alternatively, from about 1 hour to about 24 hours; or alternatively, from about 2 hours to about 8 hours. In an aspect, the aqueous alkaline solution and the mixture comprising the titanated support are insoluble and do not mix upon being contacted wherein being contacted comprises liquid/liquid extraction and optional agitation. The method further comprises ceasing contacting of the mixture comprising the titanated support and the aqueous alkaline solution (e.g., separation of the mixture and the solution), to provide a mixture comprising a hydrolyzed metalized support having a temperature in a range of from about 35° C. to about 500° C.; alternatively, from about 50° C. to about 200° C.; or alternatively, from about 75° C. to about 125° C. The method further comprises drying the hydrolyzed metalized support by maintaining the temperature of the hydrolyzed metalized support in a range of from about 35° C. to about 500° C.; alternatively, from about 50° C. to about 200° C.; or alternatively, from about 75° C. to about 125° C. to form a pre-catalyst.

In an alternative aspect, a method for preparation of an olefin polymerization catalyst comprises contacting a chromium-containing compound and a mixture comprising a titanated support to form a mixture comprising a metalized support. In an aspect, the mixture comprising the titanated support comprises a solvent suitable for use as disclosed herein (e.g., heptane). The mixture comprising the metalized support may be heated and contacted with an aqueous alkaline solution to provide a mixture comprising a hydrolyzed metalized support. The hydrolyzed metalized support may be dried to form a pre-catalyst.

In an alternative aspect, the chromium-containing compound and a mixture comprising a hydrolyzed support prepared by liquid/liquid extraction with an aqueous alkaline solution are contacted to form the mixture comprising the hydrolyzed metalized support. The hydrolyzed metalized support may be dried to form the pre-catalyst.

In another alternative aspect, the chromium-containing compound and a hydrolyzed pre-catalyst prepared by liquid/liquid extraction with an aqueous alkaline solution are contacted to form the pre-catalyst.

In any aspect of the present disclosure, a method for preparation of an olefin polymerization catalyst further comprises activating a pre-catalyst prepared as disclosed herein via a calcination step. In some aspects, calcination of the pre-catalyst comprises heating the pre-catalyst in an oxidizing environment to produce the olefin polymerization catalyst. For example, the pre-catalyst may be calcined by heating the pre-catalyst in the presence of air to a temperature in a range of from about 400° C. to about 1000° C.; alternatively, from about 500° C. to about 900° C.; or alternatively, from about 500° C. to about 850° C. Calcination of the pre-catalyst may further comprise maintaining the temperature of the pre-catalyst in the presence of air in the range of from about 400° C. to about 1000° C.; alternatively, from about 500° C. to about 900° C.; or alternatively, from about 500° C. to about 850° C. for a time period in a range of from about 1 minute to about 24 hours; alternatively, from about 1 minute to about 12 hours; alternatively, from about 20 minutes to about 12 hours; alternatively, from about 1 hour to about 10 hours; alternatively, from about 3 hours to about 10 hours; or alternatively, from about 3 hours to about 5 hours to produce the olefin polymerization catalyst.

During catalyst production, materials such as highly reactive volatile organic compounds (HRVOC), may be emitted. HRVOCs play a role in the formation of ozone in ozone nonattainment areas, i.e., areas that do not meet the Environmental Protection Agency's air quality standards for ground-level ozone. In an aspect of the present disclosure, an olefin polymerization catalyst prepared as disclosed herein results in a reduction in the level of HRVOCs produced during the olefin polymerization catalyst preparation. For example, the HRVOCs may comprise hydrocarbons, aromatic compounds, alcohols, ketones, or combinations thereof. In an aspect of the present disclosure, the HRVOCs comprise alcohols and alkenes non-limiting examples of which include ethanol, propanol, butanol, ethylene, propylene, and butane.

The simplified reaction scheme in the FIGURE illustrates hydroxyl groups upon the surface of a silica support and replacement of Si—O—H bonds among the hydroxyl groups with Si—O—Ti bonds formed during a titanation reaction upon the support. The FIGURE also displays that one equivalent of Ti(OiPr)$_4$ can react with no more than two hydroxyl groups such that a resultant titanated support contains numerous isopropoxide (OiPr), groups bound in Ti—O-iPr bonds. The Ti—O-iPr bonds can remain intact throughout the preparation of the catalyst until encountering the elevated temperatures used to activate the catalyst during calcination. Not wishing to be limited by theory, cleavage of the Ti—O-iPr bonds generates isopropanol and contributes to HRVOC emissions. In some cases, an isopropoxide group can undergo an elimination process to generate the HRVOC propylene. In an aspect, contacting a pre-catalyst with a nitrogen containing compound as disclosed herein may be effective for removing the isopropoxide groups from the support prior to the calcination step. In a further aspect, olefin polymerization catalysts produced as disclosed herein may be characterized by HRVOC emissions that are reduced by from about 50% to about 95% when compared to the emissions from an otherwise similar olefin polymerization catalyst prepared in the absence of a nitrogen-containing compound, (e.g., an otherwise similar olefin polymerization catalyst wherein a pre-catalyst used to produce the olefin polymerization catalyst was not treated with an aqueous alkaline solution prior to being activated by calcination as disclosed herein). Alternatively, emissions of HRVOCs from olefin polymerization catalysts prepared as disclosed herein are reduced by greater than about 50%; alternatively, greater than about 75%; %; alternatively, greater than about 90%; or alternatively, greater than about 95% compared to an otherwise similar olefin polymerization catalyst prepared in the absence of the nitrogen-containing compound. In an aspect of the present disclosure, HRVOCs emissions during preparation of olefin polymerization catalysts of the type disclosed herein are less than about 5 wt. %; alternatively, less than about 2 wt. %; alternatively, less than about 1 wt. %; or alternatively, less than about 0.5 wt. % based upon the total weight of the olefin polymerization catalyst after completion of all processing steps (i.e., after activation via calcination).

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas-phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, olefin polymerization catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to, multiple loop reactors, multiple gas-phase reactors, a combination of loop and gas-phase reactors, multiple high pressure reactors, and a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system may comprise at least one loop slurry reactor. Such reactors are commonplace, and may comprise vertical or horizontal loops. Generally, continuous processes may comprise the continuous introduction of a monomer, an olefin polymerization catalyst, and/or a diluent into a polymerization reactor and the continuous removal from this reactor of a suspension comprising polymer particles and the diluent. Monomer, diluent, olefin polymerization catalyst, and optionally any comonomer may be continuously fed to a loop slurry reactor, where polymerization occurs. Reactor effluent may be flashed to remove the liquids that comprise the diluent from the solid polymer, monomer and/or comonomer. Various technologies may be used for this separation step, including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes), are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Diluents suitable for use in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is the polymerization of propylene monomer as disclosed in U.S. Pat. No. 5,455,314, which is incorporated by reference herein in its entirety.

According to yet another aspect of the present disclosure, the polymerization reactor may comprise at least one gas-phase reactor. Such systems may employ a continuous recycle stream containing one or more monomers continuously cycled through a fluidized bed in the presence of the olefin polymerization catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas-phase reactors may comprise a process for multi-step gas-phase polymerization of olefins, in which olefins are polymerized in the gaseous phase in at least two independent gas-phase polymerization zones while feeding an olefin polymerization catalyst-containing polymer formed in a first polymerization zone to a second polymerization zone. One type of gas-phase reactor suitable for use is disclosed in U.S. Pat. Nos. 4,588,790, 5,352,749, and 5,436,304, each of which is incorporated by reference in its entirety herein.

According to still another aspect of the present disclosure, a high-pressure polymerization reactor may comprise a tubular reactor or an autoclave reactor. Tubular reactors may have several zones where fresh monomer, initiators, or olefin polymerization catalysts are added. Monomer may be entrained in an inert gaseous stream and introduced at one zone of the reactor. Initiators, olefin polymerization catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor may comprise a solution polymerization reactor wherein the monomer is contacted with the olefin polymerization catalyst composition by suitable stirring or other means. A carrier comprising an organic diluent or excess monomer may be employed. If desired, the monomer may be brought in the vapor phase and into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for use in the present disclosure may further comprise any combination of at least one raw material feed system, at least one feed system for an olefin polymerization catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to, temperature, pressure, type and quantity of the olefin polymerization catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas-phase polymerization is usually in a range of from about 200 psig (1.4 MPa)-500 psig (3.45 MPa). High-pressure polymerization in tubular or autoclave reactors is generally run in a range of from about 20,000 psig (138 MPa) to 75,000 psig (518 MPa). Polymerization reactors can also be operated in a supercritical region occurring at generally higher temperatures and pressures. Operation at conditions above the critical point as indicated by a pressure/temperature diagram (supercritical phase), may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness test values. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, comonomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the olefin polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

A method of the present disclosure comprises contacting an olefin polymerization catalyst of the type described with an olefin monomer under conditions suitable for the formation of a polyolefin and recovering the polyolefin. In an aspect the olefin monomer is an ethylene monomer and the polyolefin is an ethylene polymer (polyethylene).

Polyethylene prepared as described herein may be characterized by a high load melt index (HLMI), in a range of from about 1 g/10 min. to about 500 g/10 min.; alternatively, from about 3 g/10 min. to about 300 g/10 min.; alternatively, from about 10 g/10 min. to about 100 g/10 min.; or alternatively, from about 25 g/10 min. to about 50 g/10 min. In a further aspect, the polyethylene prepared as described herein may be characterized by an HLMI that is from about 1.1 to about 1.5 times greater than the HLMI of a polymer produced by utilizing an otherwise similar olefin polymerization catalyst produced in the absence of a nitrogen-containing compound.

The HLMI represents the rate of flow of a molten polymer through an orifice of 0.0825 inch diameter when subjected to a force of 21,600 grams at 190° C. as determined in accordance with ASTM D1238-82 condition F.

EXAMPLES

The following examples are given as particular aspects of the present disclosure and to demonstrate the practice and advantages thereof. It is understood that the examples are given by way of illustration and are not intended to limit the specification or the claims to follow in any manner.

In each experiment of the following examples HA30W, a Cr/silica catalyst made by W. R Grace, was dried at 200° C.

and then titanated anhydrously with Ti(OiPr)$_4$ in heptane and dried. The various samples were then treated, as listed below, prior to activation at 650° C. The final catalysts contained 3% Ti.

Activity tests were conducted in a 2.2 liter steel reactor equipped with a marine stirrer running at 400 rpm. The reactor was surrounded by a steel jacket circulating water, the temperature of which was controlled by use of steam and water heat exchangers. These were connected in an electronic feed-back loop so that the reactor temperature could be maintained at +/−0.5° C. during the reaction.

Unless otherwise stated, a small amount (0.01 to 0.10 grams normally) of the solid chromium catalyst was first charged under nitrogen to the dry reactor. Next about 0.25 g of sulfate-treated alumina (600° C.) was added as a scavenger for poisons. Then 1.2 liter of isobutane liquid was charged and the reactor heated up to the specified temperature, usually 105° C. Finally, ethylene was added to the reactor to equal a fixed pressure, normally 550 psig (3.8 MPa), which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Example 1

The first series of experiments studied the ability of base treatment, of an anhydrously titanated support dissolved in solution, to maintain the titanation of the support and provide effective titanation to a catalyst. The results are listed in Table 1. Runs 1.1 and 1.2 are comparative runs and were not exposed to a base treatment. Run 1.3 used a titanated support prepared as described above. After treatment with Ti(OiPr)$_4$, the liquid mixture containing the titanated support was exposed to a mixture of MeOH and NH$_4$OH vapor in a 70/30 volume ratio at 160° C. for 24 hours by bubbling the MeOH/NH$_4$OH vapor through the liquid mixture containing the titanated support. The melt index data of Run 1.3 shows that base treatment did not degrade catalyst performance but resulted in an increase of greater than 10% in the HLMI value with respect to the comparative runs.

Example 2

The next series of experiments studied the ability of base treatment of a solid, anhydrously titanated support to maintain the titanation of the support and provide effective titanation to a catalyst. In these experiments, a silica support like that used above was again titanated via the same procedure described. This served as the base catalyst for the finishing treatment experiments.

The results of different post-treatments are listed in Table 2. A comparative run was also conducted (Run 2.1) in which the catalyst was given no post-treatment. In Run 2.2 the solid titanated support was exposed to n-propanol vapor at 200° C. for 3 hours and one can see the loss in melt index potential that this caused. Propanol, and other alcohols, are thought to hydrolyze the Si—O—Ti bond, thus destroying the effectiveness of the Ti. In Run 2.3, the titanated support was washed in aqueous NH$_4$OH solution (5 wt. %), and then dried and calcined in the usual manner. The HLMI value for the base-washed catalyst was nearly 30% greater than the comparative run and suggested that the hydrolysis of Si—O—Ti bonds known to occur during calcination had been repressed by the base wash. In Run 2.4, the same procedure used to produce the titanated catalyst of Run 2.2 was employed again. After the titanated support was washed with aqueous NH$_4$OH the catalyst of Run 2.4 was exposed to methanol vapor at 160° C. for 24 hours. The degradation to the melt index potential observed between Runs 2.3 and 2.4 may again be explained by hydrolysis of the Si—O—Ti bonds, however, the degradation was less severe than what was observed in Run 2.2 that did not include treating the titanated support with NH$_4$OH hydroxide before prolonged exposure to hot alcohol vapor. Some of the protective effect of the NH$_4$OH treatment held up even though it evaporated during the heat treatment.

In Run 2.5 the titanated support was dry-mixed with urea before activation and was not washed with aqueous NH$_4$OH. This experiment was designed to capture the ammonia produced by decomposition of urea that occurs at elevated temperatures. However, urea decomposition occurs at just slightly above 100° C., and this approach may not be useful at higher temperatures.

TABLE 1

Anhydrously-Titanated Supports Treated with MeOH/NH$_4$OH

| Run No. | Treatment | Ind. Time min | Prod g/g | Activity g/g-h | MI dg/min | I10 dg/min | HLMI dg/min |
|---|---|---|---|---|---|---|---|
| 1.1 | None | 11 | 2455 | 1259 | 0.23 | 4.69 | 21.5 |
| 1.2 | None | 5 | 2271 | 2349 | 0.29 | 5.91 | 28.0 |
| 1.3 | MeOH + NH$_4$OH vapor 160° C., 24 h | 5 | 2511 | 1815 | 0.38 | 6.68 | 31.2 |

TABLE 2

Dried Titanated Supports Washed with NH₄OH

| Run No. | Treatment | Ind. Time min | Prod g/g | Activity g/g-h | MI dg/min | I10 dg/min | HLMI dg/min |
|---|---|---|---|---|---|---|---|
| 2.1 | None | 8 | 2534 | 2715 | 0.40 | 7.70 | 36.7 |
| 2.2 | PrOH, 200° C. | 18 | 2990 | 3590 | 0.17 | 3.5 | 18.4 |
| 2.3 | NH₄OH Wash | 8 | 2676 | 4013 | 0.59 | 10.4 | 47.7 |
| 2.4 | NH₄OH wash MeOH vapor 160° C. 24 h | 5 | 2781 | 4391 | 0.28 | 5.85 | 27.3 |
| 2.5 | Dry mix urea | 13 | 3319 | 3433 | 0.33 | 6.3 | 30.6 |

Example 3

The next series of experiments studied whether washing a pre-catalyst with aqueous base prior to activation would hydrolyze residual Ti-isopropoxide bonds and reduce the amount of carbon retained on the pre-catalyst. Pre-catalysts that had not been calcined were obtained, Run 3.1 was not treated further and Run 3.2 was washed with aqueous base. Both samples were analyzed for residual carbon, nitrogen, hydrogen and sulfur by combustion analysis and the results are shown in Table 3. The aqueous base wash resulted in a reduction of retained carbon of greater than 90%. Retained carbon in the form of isopropoxide groups is at least partly responsible for the emission of VOCs and HRVOCs produced during activation of the catalyst described herein. The experimental results suggest that washing a pre-catalyst with an aqueous base prior to activation could reduce the amount of HRVOCs emitted during production the catalyst as disclosed herein.

TABLE 3

Reduction in Elemental Emissions by Aqueous Base Wash

| Run No. | Treatment | Carbon % | Hydrogen % | Nitrogen % | Sulfur % |
|---|---|---|---|---|---|
| 3.1 | None | 4.84 | 1.99 | 0.01 | 0.001 |
| 3.2 | NH₄OH | 0.40 | 1.44 | 0.41 | 0.001 |

Additional Disclosure

The following enumerated aspects of the present disclosures are provided as non-limiting examples.

A first aspect which is a method of preparing a hydrolyzed pre-catalyst comprising: a) drying a silica support by heating the silica support to a temperature in a range of from about 150° C. to about 250° C. and maintaining the temperature of the silica support in the range of from about 150° C. to about 250° C. for a time period of from about 1 hour to about 24 hours to form a dried support; b) contacting the dried support and a titanium(IV) alkoxide to form a titanated support; c) drying the titanated support by heating the titanated support to a temperature in a range of from about 50° C. to about 200° C. and maintaining the temperature of the titanated support in the range of from about 50° C. to about 200° C. for a time period of from about 30 minutes to about 6 hours to form a dried titanated support; d) contacting the dried titanated support and an aqueous alkaline solution comprising from about 3 wt. % to about 20 wt. % of a nitrogen-containing compound for a time period of from about 10 minutes to about 6 hours to form a mixture comprising a hydrolyzed titanated support wherein a weight ratio of the amount of aqueous alkaline solution to the amount of titanium(IV) alkoxide in the dried titanated support is from about 30:1 to about 3:1; and e) removing the hydrolyzed titanated support from the mixture comprising the hydrolyzed titanated support and drying the hydrolyzed titanated support by heating the hydrolyzed titanated support to a temperature in a range of from about 50° C. to about 200° C. and maintaining the temperature of the hydrolyzed titanated support in the range of from about 50° C. to about 200° C. for a time period of from about 30 minutes to about 6 hours to form the hydrolyzed pre-catalyst.

A second aspect which is the method of the first aspect further comprising: contacting, to form a pre-catalyst, a chromium-containing compound and at least one material selected from the group consisting of the silica support, the dried support, the titanated support, the dried titanated support, the mixture comprising the hydrolyzed titanated support, and the hydrolyzed pre-catalyst; and calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A third aspect which is the method of the second aspect wherein an amount of highly reactive volatile organic compounds (HRVOC) emitted during calcining the pre-catalyst is reduced by from about 80% to about 95%, as determined by combustion analysis in accordance with Environmental Protection Agency (EPA) Method 18-type/American Society for Testing and Materials (ASTM) D1946, when compared to the amount of HRVOC emitted during calcining an otherwise similar pre-catalyst prepared in the absence of an aqueous alkaline solution.

A fourth aspect which is the method of the second aspect wherein an amount of HRVOC emitted during calcining the pre-catalyst is less than about 1 wt. % as determined by combustion analysis in accordance with EPA Method 18-type/ASTM D1946.

A fifth aspect which is the method of any of the first four aspects wherein the nitrogen-containing compound comprises an amide, an amidine, an amine, a diamine, a triamine, an amino acid, an ammonium hydroxide, a formamide, a hydrazine, a hydroxylamine, an imidazole, a piperazine, a piperidine, a pyrazine, a pyrazole, a pyridine, a pyrimidine, a pyrrole, a urea, or a combination thereof.

A sixth aspect which is the method of any of the first five aspects wherein the nitrogen-containing compound has Structure 1, Structure 2, Structure 3, or Structure 4: where each $R^1$, each $R^2$, and each $R^3$ are independently hydrogen, a $C_1$ to $C_6$ organyl group or a $C_1$ to $C_6$ aryl group; each $R^4$ is $CH_3$ or $C_2H_5$, and $R^5$ is hydrogen, $CH_3$, OH, or $OCH_3$.

$$N(R^1)_3 \quad \text{Structure 1}$$

$$N(R^2)_4OH \quad \text{Structure 2}$$

$$N(R^3)_2OH \quad \text{Structure 3}$$

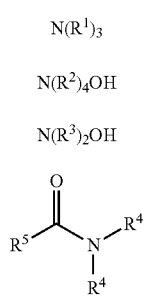

Structure 4

A seventh aspect which is the method of any of the first six aspects wherein the nitrogen-containing compound comprises ammonia, ammonium hydroxide, tetraethylammonium hydroxide, tetramethylammonium hydroxide, hydrazine, hydroxylamine, triethyl amine, trimethyl amine, acetamide, creatine, 1,4-diazabicyclo[2.2.2]octane (DABCO), 1,5-diazabicyclo[4.3.0]non-5-ene (DBN), 1,8-diazabicyclo[5.4.0]undec-7-ene (DBU), N,N-diisopropyl-ethylamine (DIPEA), dimethyl carbamate, formamide, methyl formamide, dimethyl formamide, dimethyl glycine, 1,4-dimethylpiperazine (DMP), 1,3-dimethyl urea, imidazole, piperazine, piperidine, pyrazine, pyrazole, pyridine, pyrimidine, pyrrole, tetramethylethylenediamine (TMEDA), triazine, 1,3,5-triazacyclohexane, 1,3,5-trimethyl-1,3,5-triazacyclohexane (TMTAC), or a combination thereof.

An eighth aspect which is the method of any of the first seven aspects wherein the titanium(IV) alkoxide comprises titanium(IV) ethoxide, titanium(IV) isopropoxide, titanium (IV) n-propoxide, titanium(IV) n-butoxide, titanium(IV) isobutoxide, or a combination thereof.

A ninth aspect which is the method of any of the first eight aspects wherein the titanium(IV) alkoxide comprises titanium(IV) isopropoxide.

A tenth aspect which is the method of any of the first nine aspects wherein the silica support is characterized by a surface area of from about 100 $m^2$/gram to about 1000 $m^2$/gram and a pore volume of from about 1.0 $cm^3$/gram to about 2.5 $cm^3$/gram.

An eleventh aspect which is the method of any of the second through tenth aspects wherein the chromium-containing compound comprises chromium trioxide, chromium acetate, chromium nitrate, tertiary butyl chromate, biscyclopentadienyl chromium(II), chromium(III) acetylacetonate, or a combination thereof.

A twelfth aspect which is the method of any of the second through eleventh aspects wherein an amount of titanium present in the catalyst ranges from about 0.01% to about 10% by total weight of the catalyst.

A thirteenth aspect which is the method of any of the second through twelfth aspects wherein an amount of chromium present in the catalyst ranges from about 0.01% to about 10% by total weight of the catalyst.

A fourteenth aspect which is a method of forming an ethylene polymer comprising contacting the catalyst prepared by the method of any of the second through twelfth aspects with an ethylene monomer under conditions suitable for formation of the ethylene polymer and recovering the ethylene polymer.

A fifteenth aspect which is the method of the fourteenth aspect wherein the ethylene polymer has a high load melt index (HLMI) that is from about 10% to about 100% greater than the HLMI of an ethylene polymer produced by utilizing an otherwise similar catalyst produced in the absence of an aqueous alkaline solution.

A sixteenth aspect which is a method of preparing a hydrolyzed pre-catalyst comprising: a) drying a silica support by heating the silica support to a temperature in a range of from about 150° C. to about 250° C. and maintaining the temperature of the silica support in the range of from about 150° C. to about 250° C. for a time period of from about 1 hour to about 24 hours to form a dried support; b) contacting the dried support and a titanium(IV) alkoxide to form a titanated support; c) heating the titanated support to a temperature in a range of from about 50° C. to about 200° C. and maintaining the temperature in the range of from about 50° C. to about 200° C. while contacting the titanated support and an alkaline material for a time period of from about 2 hours to about 48 hours; d) ceasing contacting of the titanated support and the alkaline material to provide a hydrolyzed support having a temperature in a range of from about 50° C. to about 200° C.; and e) maintaining the temperature of the hydrolyzed support in the range of from about 50° C. to about 200° C. for a time period of from about 30 minutes to about 6 hours to form the hydrolyzed pre-catalyst.

A seventeenth aspect which is the method of the sixteenth aspect further comprising contacting, to form a pre-catalyst, a chromium-containing compound and at least one material selected from the group consisting of the silica support, the dried support, the titanated support, the hydrolyzed support, and the hydrolyzed pre-catalyst; and calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form a catalyst.

An eighteenth aspect which is the method of the seventeenth aspect wherein an amount HRVOC emitted during calcining the pre-catalyst is reduced by from about 80% to about 95%, as determined by combustion analysis in accordance with EPA Method 18-type/ASTM D1946, when compared to the amount of HRVOC emitted during calcining an otherwise similar pre-catalyst prepared in the absence of an alkaline material.

A nineteenth aspect which is the method of the seventeenth aspect wherein an amount HRVOC emitted during calcining the pre-catalyst is less than about 1 wt. % as determined by combustion analysis in accordance with EPA Method 18-type/ASTM D1946.

A twentieth aspect which is the method of the sixteenth aspect wherein the alkaline material comprises a vapor associated with a basic liquid wherein the basic liquid comprises an aqueous solution of a nitrogen-containing compound and optionally an alcohol wherein an amount of nitrogen-containing compound in the aqueous solution is from about 3 wt. % to about 20 wt. % wherein a volumetric ratio of the aqueous solution to the alcohol is from about 7:3 to about 3:7 and wherein the alcohol is methanol, ethanol, n-propanol, isopropanol, or a combination thereof.

A twenty-first aspect which is the method of the sixteenth aspect wherein the alkaline material is an aqueous alkaline solution comprising a nitrogen-containing compound in an amount from about 3 wt. % to about 20 wt. % wherein a weight ratio of the amount of aqueous alkaline solution to the amount of titanium(IV) alkoxide in the titanated support is from about 30:1 to about 3:1.

A twenty-second aspect which is the method of any of the sixteenth through twenty-first aspects wherein the alkaline material comprises an amide, an amidine, an amine, a diamine, a triamine, an amino acid, an ammonium hydroxide, a formamide, a hydrazine, a hydroxylamine, an imidazole, a piperazine, a piperidine, a pyrazine, a pyrazole, a pyridine, a pyrimidine, a pyrrole, a urea, or a combination thereof.

A twenty-third aspect which is the method of any of the sixteenth through twenty-second aspects wherein the alkaline material has Structure 1, Structure 2, Structure 3, or Structure 4: where each $R^1$, each $R^2$, and each $R^3$ are independently hydrogen, a $C_1$ to $C_6$ organyl group or a $C_1$ to $C_6$ aryl group; each $R^4$ is $CH_3$ or $C_2H_5$; and $R^5$ is hydrogen, $CH_3$, OH, or $OCH_3$.

Structure 1
$N(R^1)_3$

Structure 2
$N(R^2)_4OH$

Structure 3
$N(R^3)_2OH$

Structure 4
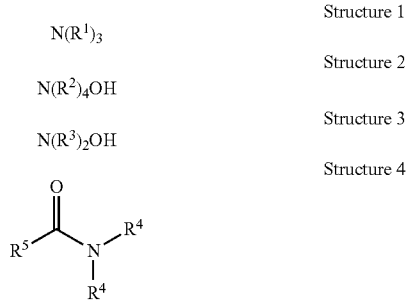

A twenty-fourth aspect which is the method of any of the sixteenth through twenty-third aspects wherein the alkaline material comprises ammonia, ammonium hydroxide, tetraethylammonium hydroxide, tetramethylammonium hydroxide, hydrazine, hydroxylamine, triethyl amine, trimethyl amine, acetamide, creatine, 1,4-diazabicyclo[2.2.2]octane (DABCO), 1,5-diazabicyclo[4.3.0]non-5-ene (DBN), 1,8-diazabicyclo[5.4.0]undec-7-ene (DBU), N,N-diisopropylethylamine (DIPEA), dimethyl carbamate, formamide, methyl formamide, dimethyl formamide, dimethyl glycine, 1,4-dimethylpiperazine (DMP), 1,3-dimethyl urea, imidazole, piperazine, piperidine, pyrazine, pyrazole, pyridine, pyrimidine, pyrrole, tetramethylethylenediamine (TMEDA), triazine, 1,3,5-triazacyclohexane, 1,3,5-trimethyl-1,3,5-triazacyclohexane (TMTAC), or a combination thereof.

A twenty-fifth aspect which is the method of any of the sixteenth through twenty-fourth aspects wherein the titanium(IV) alkoxide comprises titanium(IV) ethoxide, titanium (IV) isopropoxide, titanium(IV) n-propoxide, titanium(IV) n-butoxide, titanium(IV) isobutoxide, or a combination thereof.

A twenty-sixth aspect which is the method of the seventeenth aspect wherein an amount of chromium present in the catalyst ranges from about 0.01% to about 10% by total weight of the catalyst.

A twenty-seventh aspect which is a method of preparing a catalyst comprising: a) drying a chrominated-silica support by heating the chrominated-silica support to a temperature in a range of from about 150° C. to about 250° C. and maintaining the temperature of the chrominated-silica support in the range of from about 150° C. to about 250° C. for a time period of from about 1 hour to about 24 hours to form a dried chrominated-silica support; b) contacting the dried chrominated-silica support and a titanium(IV) alkoxide to form a metalized support; c) drying the metalized support by heating the metalized support to a temperature in a range of from about 50° C. to about 200° C. and maintaining the temperature of the metalized support in the range of from about 50° C. to about 200° C. for a time period of from about 30 minutes to about 6 hours to form a dried metalized support; d) contacting the dried metalized support and an aqueous alkaline solution comprising from about 3 wt. % to about 20 wt. % of a nitrogen-containing compound for a time period of from about 10 minutes to about 6 hours to form a mixture comprising a hydrolyzed metalized support wherein a weight ratio of the amount of aqueous alkaline solution to the amount of titanium(IV) alkoxide in the dried metalized support is from about 30:1 to about 3:1; e) removing the hydrolyzed metalized support from the mixture comprising the hydrolyzed metalized support and drying the hydrolyzed metalized support by heating the hydrolyzed metalized support to a temperature in a range of from about 50° C. to about 200° C. and maintaining the temperature of the hydrolyzed metalized support in the range of from about 50° C. to about 200° C. for a time period of from about 30 minutes to about 6 hours to form a pre-catalyst; and f) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form the catalyst.

A twenty-eighth aspect which is a method of preparing a catalyst comprising: a) drying a silica support by heating the silica support to a temperature in a range of from about 150° C. to about 250° C. and maintaining the temperature of the silica support in the range of from about 150° C. to about 250° C. for a time period of from about 1 hour to about 24 hours to form a dried support; b) contacting the dried support and a titanium(IV) alkoxide to form a titanated support; c) drying the titanated support by heating the titanated support to a temperature in a range of from about 50° C. to about 200° C. and maintaining the temperature of the titanated support in the range of from about 50° C. to about 200° C. for a time period of from about 30 minutes to about 6 hours to form a dried titanated support; d) contacting the dried titanated support and an aqueous alkaline solution comprising from about 3 wt. % to about 20 wt. % of a nitrogen-containing compound for a time period of from about 10 minutes to about 6 hours to form a mixture comprising a hydrolyzed titanated support wherein a weight ratio of the amount of aqueous alkaline solution to the amount of titanium(IV) alkoxide in the dried titanated support is from about 30:1 to about 3:1; e) removing the hydrolyzed titanated support from the mixture comprising the hydrolyzed titanated support and drying the hydrolyzed titanated support by heating the hydrolyzed titanated support to a temperature in a range of from about 50° C. to about 200° C. and maintaining the temperature of the hydrolyzed titanated support in the range of from about 50° C. to about 200° C. for a time period of from about 30 minutes to about 6 hours to form a hydrolyzed pre-catalyst; f) contacting, to form a pre-catalyst, a chromium-containing compound and at least one material selected from the group consisting of the silica support, the dried support, the titanated support, the dried titanated support, the mixture comprising the hydrolyzed titanated support, and the hydrolyzed pre-catalyst; and g) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form the catalyst.

A twenty-ninth aspect which is a method of preparing a catalyst comprising: a) drying a chrominated-silica support by heating the chrominated-silica support to a temperature in a range of from about 150° C. to about 250° C. and maintaining the temperature of the chrominated-silica support in the range of from about 150° C. to about 250° C. for a time period of from about 1 hour to about 24 hours to form a dried chrominated-silica support; b) contacting the dried chrominated-silica support and a titanium(IV) alkoxide to form a metalized support; c) heating the metalized support to a temperature in a range of from about 50° C. to about 200° C. and maintaining the temperature in the range of from about 50° C. to about 200° C. while contacting the metalized support and a gas-phase solution material for a time period of from about 2 hours to about 48 hours; d) ceasing contacting of the metalized support and the gas-phase solution to provide a hydrolyzed metalized support having a temperature in a range of from about 50° C. to about 200° C.; e) maintaining the temperature of the hydrolyzed metalized support in the range of from about 50° C. to about 200° C. for a time period of from about 30 minutes to about 6 hours to form a pre-catalyst; and f) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form the catalyst.

A thirtieth aspect which is a method of preparing a catalyst comprising: a) drying a silica support by heating the silica support to a temperature in a range of from about 150° C. to about 250° C. and maintaining the temperature of the silica support in the range of from about 150° C. to about 250° C. for a time period of from about 1 hour to about 24 hours to form a dried support; b) contacting the dried support and a titanium(IV) alkoxide to form a titanated support; c) heating the titanated support to a temperature in a range of from about 50° C. to about 200° C. and maintaining the temperature in the range of from about 50° C. to about 200° C. while contacting the titanated support and a gas-phase solution for a time period of from about 2 hours to about 48 hours; d) ceasing contacting of the titanated support and the gas-phase solution to provide a hydrolyzed support having a temperature in a range of from about 50° C. to about 200° C.; e) maintaining the temperature of the hydrolyzed support in the range of from about 50° C. to about 200° C. for a time period of from about 30 minutes to about 6 hours to form a hydrolyzed pre-catalyst; f) contacting, to form a pre-catalyst, a chromium-containing compound and at least one material selected from the group consisting of the silica support, the dried support, the titanated support, the hydrolyzed support, and the hydrolyzed pre-catalyst; and g) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form the catalyst.

The terms "a", "an", and "the" are intended, unless specifically indicated otherwise, to include plural alternatives, e.g., at least one. Herein, while methods and processes are described in terms of "comprising" various components or steps, the methods and processes can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

While various aspects of the present disclosure have been shown and described, modifications thereof can be made by one skilled in the art without departing from the spirit and teachings of the present disclosure. The aspects of the present disclosure described herein are exemplary only and are not intended to be limiting. Many variations and modifications of the present disclosure are possible and are within the scope of the present disclosure. Where numerical ranges or limitations are expressly stated, such express ranges or limitations should be understood to include iterative ranges or limitations of like magnitude falling within the expressly stated ranges or limitations (e.g., "from about 1 to about 10" includes, 2, 3, 4, etc.; "greater than 0.10" includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as "comprises", "includes", "having", etc. should be understood to provide support for narrower terms such as "consisting of", "consisting essentially of", "comprised substantially of", etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspect of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

What is claimed is:

1. A hydrolyzed pre-catalyst composition prepared by a process comprising:
    contacting (i) a dried silica support wherein the dried silica support has a loss in weight upon drying of less than about 3 wt. %; (ii) a titanium-containing compound comprising a titanium (IV) alkoxide, wherein the titanium (IV) alkoxide is titanium (IV) isopropoxide; and (iii) an aqueous alkaline solution comprising water and from about 3 wt. % to about 20 wt. % of a nitrogen-containing compound based on a total weight of the aqueous alkaline solution; and
    removing the aqueous alkaline solution to form the hydrolyzed pre-catalyst composition wherein the hydrolyzed pre-catalyst composition has a carbon content that is reduced by greater than about 50% when compared to the hydrolyzed pre-catalyst composition prepared in an absence of the aqueous alkaline solution.

2. The hydrolyzed pre-catalyst composition of claim 1, wherein the titanium-containing compound is present in an amount of from about 0.01 wt. % to about 10.0 wt. % based on the weight of the hydrolyzed pre-catalyst composition.

3. The hydrolyzed pre-catalyst composition of claim 1, wherein a weight ratio of the aqueous alkaline solution to water is from about 100:1 to about 1:1.

4. The hydrolyzed pre-catalyst composition of claim 1, wherein the nitrogen-containing compound comprises an amide, an amidine, an amine, a diamine, a triamine, an amino acid, an ammonium hydroxide, a formamide, a hydrazine, a hydroxylamine, an imidazole, a piperazine, a piperidine, a pyrazine, a pyrazole, a pyridine, a pyrimidine, a pyrrole, a urea, or a combination thereof.

5. The hydrolyzed pre-catalyst composition of claim 1, wherein the nitrogen-containing compound comprises ammonia, ammonium hydroxide, tetraethylammonium hydroxide, tetramethylammonium hydroxide, hydrazine, hydroxylamine, triethyl amine, trimethyl amine, acetamide, creatine, 1,4-diazabicyclo[2.2.2]octane (DABCO), 1,5-diazabicyclo[4.3.0]non-5-ene (DBN), 1,8-diazabicyclo[5.4.0]undec-7-ene (DBU), N,N-diisopropylethylamine (DIPEA), dimethyl carbamate, formamide, methyl formamide, dimethyl formamide, dimethyl glycine, 1,4-dimethylpiperazine (DMP), 1,3-dimethyl urea, imidazole, piperazine, piperidine, pyrazine, pyrazole, pyridine, pyrimidine, pyrrole, tetramethylethylenediamine (TMEDA), triazine, 1,3,5-triazacyclohexane, 1,3,5-trimethyl-1,3,5-triazacyclohexane (TMTAC), or combination thereof.

6. The hydrolyzed pre-catalyst composition of claim 1, wherein the aqueous alkaline solution further comprises a co-solvent.

7. The hydrolyzed pre-catalyst composition of claim 6, wherein a volumetric ratio of the co-solvent:water ranges from about 1:20 to about 20:1.

8. The hydrolyzed pre-catalyst composition of claim 1, wherein the dried silica support has a surface area ranging from about 100 $m^2$/gram to about 1000 $m^2$/gram.

9. The hydrolyzed pre-catalyst composition of claim 1, wherein the dried silica support has a pore volume ranging from about 1.0 $cm^3$/gram to about 2.5 $cm^3$/gram.

10. The hydrolyzed pre-catalyst composition of claim 1, wherein the dried silica based on a total weight of the dried silica support comprises greater than about 50 wt. % silica.

11. A hydrolyzed pre-catalyst composition comprising:
(i) a dried silica support wherein the dried silica support has a loss in weight upon drying of less than about 3 wt. %; (ii) a titanium-containing compound comprising a titanium (IV) alkoxide, wherein the titanium (IV) alkoxide is titanium (IV) isopropoxide; and (iii) an aqueous alkaline solution comprising water and from about 3 wt. % to about 20 wt. % of a nitrogen-containing compound based on a total weight of the aqueous alkaline solution; wherein the aqueous alkaline solution when removed forms the hydrolyzed pre-catalyst composition and wherein the hydrolyzed pre-catalyst composition has a carbon content that is reduced by greater than about 50% when compared to the hydrolyzed pre-catalyst composition prepared in an absence of the aqueous alkaline solution.

12. The hydrolyzed pre-catalyst composition of claim 11, wherein the dried silica support has a surface area ranging from about 100 $m^2$/gram to about 1000 $m^2$/gram.

13. The hydrolyzed pre-catalyst composition of claim 11, wherein the dried silica support has a pore volume ranging from about 1.0 $cm^3$/gram to about 2.5 $cm^3$/gram.

14. The hydrolyzed pre-catalyst composition of claim 11, wherein the dried silica based on a total weight of the dried silica support comprises greater than about 50 wt. % silica.

* * * * *